United States Patent
Shen et al.

(10) Patent No.: US 9,883,465 B2
(45) Date of Patent: Jan. 30, 2018

(54) DETERMINING TRANSMIT POWER BASED ON CATEGORIZATION OF ACCESS TERMINALS

(71) Applicant: QUALCOMM Incorporated, San Diego, CA (US)

(72) Inventors: Cong Shen, San Diego, CA (US); Christophe Chevallier, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 14/196,037

(22) Filed: Mar. 4, 2014

(65) Prior Publication Data

US 2015/0063223 A1    Mar. 5, 2015

Related U.S. Application Data

(60) Provisional application No. 61/873,513, filed on Sep. 4, 2013.

(51) Int. Cl.
| | |
|---|---|
| H04W 52/26 | (2009.01) |
| H04W 52/24 | (2009.01) |
| H04W 52/40 | (2009.01) |
| H04W 52/14 | (2009.01) |
| H04W 52/28 | (2009.01) |
| H04W 52/36 | (2009.01) |

(52) U.S. Cl.
CPC ....... *H04W 52/265* (2013.01); *H04W 52/244* (2013.01); *H04W 52/40* (2013.01); *H04W 52/143* (2013.01); *H04W 52/242* (2013.01); *H04W 52/283* (2013.01); *H04W 52/367* (2013.01)

(58) Field of Classification Search
CPC .. H04W 52/02–52/0206; H04W 52/04–52/16; H04W 52/20–52/22; H04W 52/225; H04W 52/24–52/288
See application file for complete search history.

(56) References Cited

U.S. PATENT DOCUMENTS

| | | |
|---|---|---|
| 6,262,980 B1 | 7/2001 | Leung et al. |
| 8,509,213 B2 | 8/2013 | Sivanesan et al. |
| 8,570,967 B1 | 10/2013 | Pawar et al. |
| 2009/0042593 A1 | 2/2009 | Yavuz et al. |

(Continued)

FOREIGN PATENT DOCUMENTS

| | | |
|---|---|---|
| WO | 2011103515 A1 | 8/2011 |
| WO | 2013005015 A1 | 1/2013 |

OTHER PUBLICATIONS

Partial International Search Report—PCT/US2014/053869—ISA/EPO—Nov. 24, 2014.

(Continued)

*Primary Examiner* — Eric Myers
(74) *Attorney, Agent, or Firm* — Muncy, Geissler, Olds & Lowe, P.C.

(57) ABSTRACT

Transmit power management for small cells in a wireless communication environment may be achieved by receiving information generated by a plurality of access terminals associated with an access point, categorizing the access terminals based on the received information, and determining transmit power for the access point based on the categorization of the access terminals.

72 Claims, 12 Drawing Sheets

(56) References Cited

U.S. PATENT DOCUMENTS

2012/0142392 A1\* 6/2012 Patel .................. H04W 52/143
                                                    455/522
2012/0252521 A1  10/2012 Nagaraja et al.
2013/0137475 A1   5/2013 Rousu et al.
2013/0225181 A1   8/2013 Radulescu et al.

OTHER PUBLICATIONS

International Search Report and Written Opinion—PCT/US2014/053869—ISA/EPO—Mar. 3, 2015.
European Search Report—EP17183122—Search Authority—The Hague—Oct. 11, 2017.

\* cited by examiner

DETERMINING TRANSMIT POWER BASED ON CATEGORIZATION OF ACCESS TERMINALS

CROSS-REFERENCE TO RELATED APPLICATIONS

The present Application for Patent claims the benefit of U.S. Provisional Application No. 61/873,513, entitled "DETERMINING TRANSMIT POWER BASED ON CATEGORIZATION OF ACCESS TERMINALS," filed Sep. 4, 2013, assigned to the assignee hereof, and expressly incorporated herein by reference in its entirety.

INTRODUCTION

Aspects of this disclosure relate generally to telecommunications, and more particularly to transmit power management for small cells and the like.

A wireless communication network may be deployed to provide various types of services (e.g., voice, data, multimedia services, etc.) to users within a coverage area of the network. In some implementations, one or more macro access points (e.g., corresponding to different macro cells) provide wireless connectivity for access terminals (e.g., cell phones) that are operating within the coverage of the macro access point(s).

In some networks, low-power access points are deployed to supplement conventional network access points (e.g., macro access points). In general, these low-power access points provide more robust coverage and higher throughput for access terminals in the vicinity of the low-power access points. For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.). Typically, low-power access points connect to the Internet via a broadband connection (e.g., a digital subscriber line (DSL) router, a cable modem, or some other type of modem) that provides a backhaul link to a mobile operator's network. Thus, a low-power access point deployed in a user's home or business provides mobile network access to one or more devices via the broadband connection.

In different deployments, low-power access points may be implemented as or referred to as small cells, such as home NodeBs (HNBs), home eNodeBs (HeNBs), femto cells, femto access points, femto nodes, access point base stations, pico cells, pico nodes, or micro cells. Thus, it should be appreciated that any discussion related to small cells herein may be equally applicable to a variety of low-power access points in general.

Due to the scarcity of spectrum resources, small cells sometimes share the same frequency channels used by the macro cells (a.k.a., co-channel deployment). However, such co-channel deployment poses a challenge for interference management, since unplanned and unmanaged small cells may result in excessive radio frequency (RF) interference to the macro cell downlink (DL).

In some cases, small cell transmit power self-calibration is used to address this challenge. Conventionally, transmit power self-calibration for small cells is focused on closed (or hybrid) access small cells. In these scenarios, there is a hierarchy of access terminals. In closed access, only the access terminals allowed in the small cell have access to the small cell. In hybrid access, there is a preference that some access terminals will have higher priority to access the small cell than any other access terminals. In open access small cells, however, the small cell may allow any access terminal to obtain any type of service via the small cell.

SUMMARY

Systems and methods for transmit power management for small cells in a wireless communication environment are disclosed.

An apparatus for communication is disclosed. The apparatus may comprise, for example, a communication device and a processing system. The communication device may be configured to receive information generated by a plurality of access terminals associated with an access point. The processing system may be configured to categorize the access terminals based on the received information, and determine transmit power for the access point based on the categorization of the access terminals.

A method of determining transmit power is also disclosed. The method may comprise, for example: receiving information generated by a plurality of access terminals associated with an access point; categorizing the access terminals based on the received information; and determining transmit power for the access point based on the categorization of the access terminals.

Another apparatus for communication is also disclosed. The apparatus may comprise, for example: means for receiving information generated by a plurality of access terminals associated with an access point; means for categorizing the access terminals based on the received information; and means for determining transmit power for the access point based on the categorization of the access terminals.

A computer-readable medium is also disclosed. The computer-readable medium may comprise, for example, code for causing a computer to: receive information generated by a plurality of access terminals associated with an access point; categorize the access terminals based on the received information; and determine transmit power for the access point based on the categorization of the access terminals.

BRIEF DESCRIPTION OF THE DRAWINGS

These and other sample aspects of the disclosure will be described in the detailed description and the claims that follow, and in the accompanying drawings, wherein:

Figure 1:
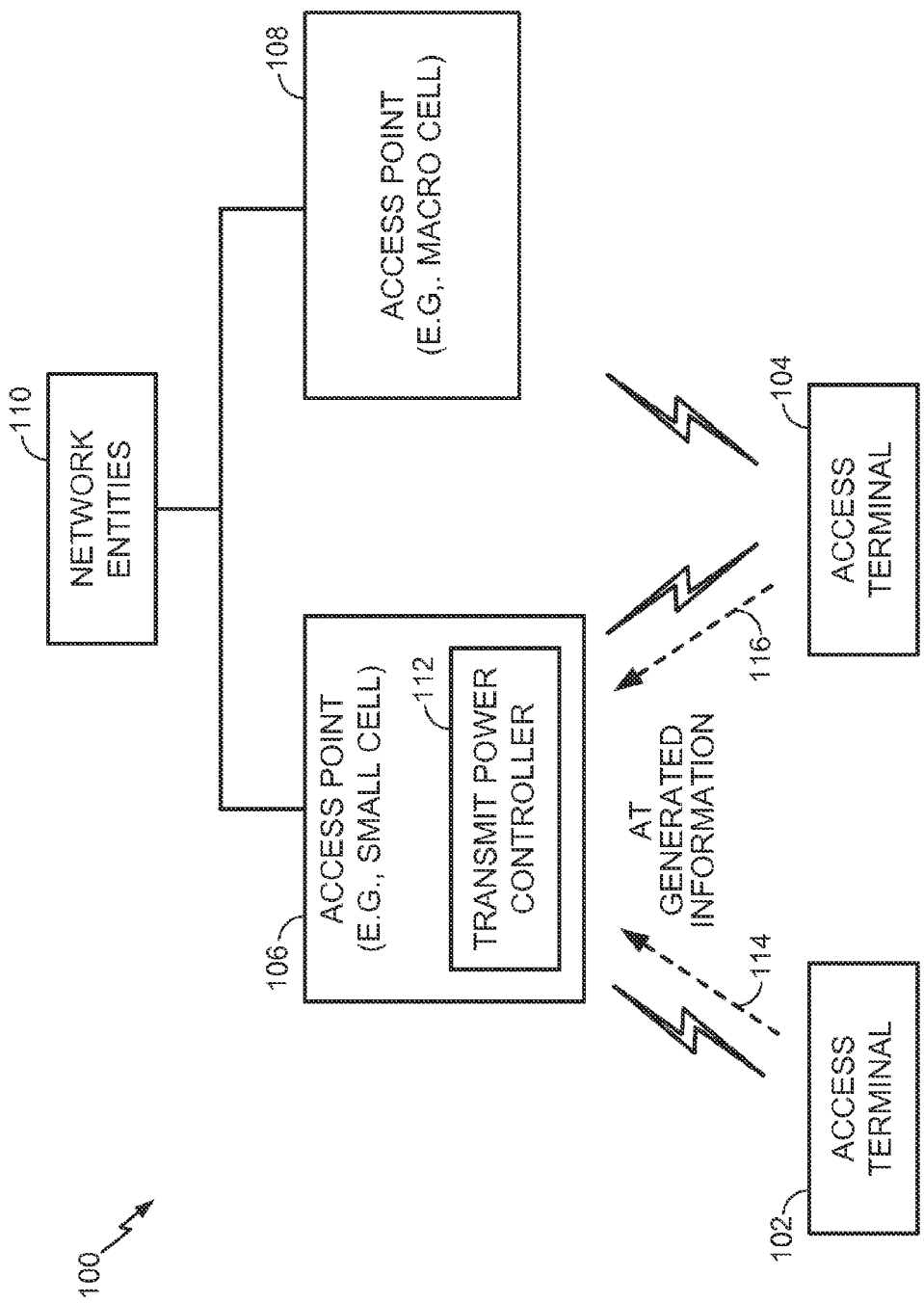
FIG. 1 is a simplified block diagram of several sample aspects of a communication system adapted to support determining transmit power based on access terminal categorization.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

The disclosure relates in some aspects to determining transmit power for an access point based on categorization of access terminals associated with that access point. For example, access terminals associated with an access point may be categorized as 1) access terminals that need to be served by the access point; 2) access terminals that need to be protected from the access point; and 3) other access terminals. The transmit power to be used by the access point is determined via a compromise between the needs of these competing access terminals. For example, transmit power may initially be set to provide a target level of coverage for the access terminals that need to be served by the access point. The transmit power may then be adjusted to protect the other access terminals, if needed.

The disclosure also relates in some aspects to transmit power self-calibration for small cells (e.g., UMTS small cells) operating co-channel with a macro cell, in which the small cells are configured for open access. In such a deployment, transmit power control as taught herein may mitigate issues that may arise due to lack of active hand-in (AHI) support, or due to signaling load concerns. For example, the disclosed transmit power control may provide enhanced small cell performance in terms of providing sufficient small cell coverage and at the same time reducing interference to nearby macro cell users in the network.

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, any aspect disclosed herein may be embodied by one or more elements of a claim. For convenience, the term some aspects may be used herein to refer to a single aspect or multiple aspects of the disclosure.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macro cells, and so on, while access terminals may be referred to or implemented as user equipment (UEs), mobile stations, and so on.

Access points in the system 100 provide access to one or more services (e.g., network connectivity) for one or more wireless terminals that may be installed within or that may roam throughout a coverage area of the system 100. For example, at various points in time the access terminal 102 may connect to an access point 106 or some other access point in the system 100 (not shown). Similarly, the access terminal 104 may connect to the access point 106, an access point 108, or some other access point.

Each of the access points may communicate with one or more network entities (represented, for convenience, by the network entities 110), including each other, to facilitate wide area network connectivity. Two or more of such network entities may be co-located and/or two or more of such network entities may be distributed throughout a network.

A network entity may take various forms such as, for example, one or more radio and/or core network entities. Thus, in various implementations the network entities 110 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals.

Some of the access points in the system 100 (e.g., the access point 106) may comprise small cells. As used herein, the term small cell refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in the coverage area. In some implementations, each small cell has a transmit power (e.g., as defined above) that is less than a transmit power (e.g., as defined above) of the macro access point by a relative margin (e.g., 10 dBm or more). In some implementations, small cells may have a maximum transmit power of 20 dBm or less. In some implementations, small cells such as pico cells may have a maximum transmit power of 24 dBm or less. It should be appreciated, however, that these or other types of small cells may have a higher or lower maximum transmit power in other implementations (e.g., up to 1 Watt in some cases, up to 10 Watts in some cases, and so on).

Small cells may be configured to support different types of access modes. For example, in an open access mode, a small cell may allow any access terminal to obtain any type of service via the small cell. In a restricted (or closed) access mode, a small cell may only allow authorized access terminals to obtain service via the small cell. For example, a small cell may only allow access terminals (e.g., so called home access terminals) belonging to a certain subscriber group (e.g., a closed subscriber group (CSG)) to obtain service via the small cell. In a hybrid access mode, alien access terminals (e.g., non-home access terminals, non-CSG access terminals) may be given limited access to the small cell. For example, a macro access terminal that does not belong to a small cell's CSG may be allowed to access the small cell only if sufficient resources are available for all home access terminals currently being served by the small cell.

Thus, small cells operating in one or more of these access modes may be used to provide indoor coverage and/or extended outdoor coverage. By allowing access to users through adoption of a desired access mode of operation, small cells may provide improved service within the coverage area and potentially extend the service coverage area for users of a macro network.

In the example of FIG. 1, the access point 106 includes a transmit power controller 112 that specifies transmit power for the access point 106 based on access terminal (AT) generated information 114 and 116 received from the access terminals 102 and 104, respectively. The information 114 and 116 may include, for example, measurement report messages, cell update messages, and registration messages. The transmit power controller 112 categorizes the access terminals based on the received information to identify, for example, access terminals that should be served by the access point, access terminals that should be specifically protected from transmissions by the access point, and other access terminals. The transmit power controller 112 then calculates the transmit power for the access point 106 taking these categories into account. Additional details regarding the received information, the categorization, and the transmit power calculation are set forth below.

In some aspects, the disclosed power control is advantageously employed in an open-access deployment model for small cells. As mentioned above, such a deployment model can offload users from the macro network and increase the overall system capacity and enhance user experience. Transmit power control (e.g., power self-calibration) for open-access small cell scenarios may address several issues. Firstly, small cell leakage outside an intended coverage area may impact the call quality of passing-by access terminals with active calls to the macro network. In the absence of active hand-in (AHI) support, these passing-by access terminals will see stronger downlink (DL) interference from the small cell as they move closer to the small cell, and eventually will drop the calls. Secondly, small cell leakage will increase the unnecessary signaling load on the passing-by access terminals, as they will try to re-select to the small cell but will not stay long enough to request any service. If the deployment of small cells is very dense, then without small cell power self-calibration, there also may be a significant pilot pollution problem, where an access terminal can see multiple small cells with similar pilot strength. In this case, cell selection for the access terminal may ping-pong back and forth among these small cells.

For open-access small cells, there is no distinction between access point-permitted users and non-allowed users, so previous techniques that rely on the distinction of Home UE (HUE) and Macro UE (MUE) will not provide good performance. In contrast, power control as taught herein may resolve the above issues, at least in part, while providing sufficient coverage to small cell users. Through the use of the disclosed power control, signal leakage may be reduced which, in turn, may reduce the number of macro-to-macro inter-frequency handovers for users passing the coverage region of the small cell. Also, if no AHI support is available, the use of this power control may reduce signaling load and, as a result, reduce unnecessary idle reselection to the small cell from access terminals that are passing-by the small cell. Use of this power control also may mitigate the pilot pollution problem.

For purposes of illustration, FIG. 1 illustrates power control at an access point based on information from two access terminals. It should be appreciated that the teachings herein may be incorporated into other configurations. For example, transmit power for other access points may be controlled in a similar manner. Also, information may be received from a different number of access terminals. In addition, information may be received in different forms (e.g., via different types of signaling) in different implementations.

In some implementations, the transmit power calculations are performed by another entity on behalf of an access point. In this case, information generated by access terminals may be forwarded (e.g., by a serving access point) to the entity (e.g., one of the network entities 110). For example, a message from an access terminal may be forwarded, or information may be extracted from a message and the extracted information forwarded. This other entity may then calculate the transmit power for the access point and send an indication of the transmit power to the access point. In some implementations, the entity may be a small cell management system (e.g., a HNB management system). In some implementations, the entity calculates transmit power for multiple access points.

Sample operations relating to determining transmit power in accordance with the teachings herein will be described in more detail in conjunction with the flowcharts of FIGS. 2-6. For convenience, the operations of FIGS. 2-6 (or any other operations discussed or taught herein) may be described as being performed by specific components (e.g., components of FIG. 1, FIG. 7, FIG. 11, or FIG. 12). It should be appreciated, however, that these operations may be performed by other types of components and may be performed using a different number of components. It also should be appreciated that one or more of the operations described herein may not be employed in a given implementation.

Figure 2:
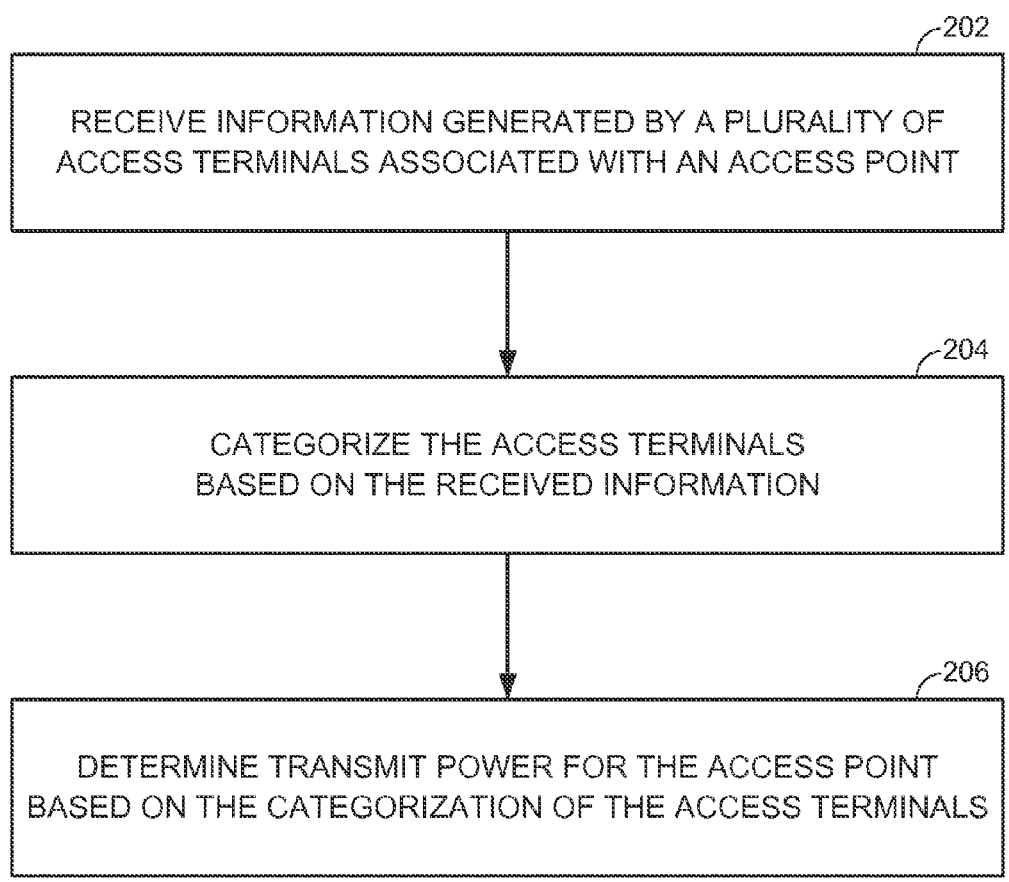
FIG. 2 is flowchart of several sample aspects of operations that may be performed in conjunction with determining transmit power based on access terminal categorization.

FIG. 2 illustrates an example of operations that may be performed by an access point, or some other suitable entity, in conjunction with determining transmit power for the access point. In a typical implementation, the access point comprises a small cell.

As represented by block 202, information generated by a plurality of access terminals associated with an access point is received. This information may be received in different ways in different implementations.

In some implementations, an access point may receive information directly, via radio frequency (RF) signaling, from access terminals. For example, an access point may receive messages from served access terminals and/or messages from access terminals that attempt to communicate with the access point.

In some implementations, an entity may receive information in a less direct manner. For example, a network entity may receive messages comprising the information generated by the access terminals. In this case, an access point that directly receives messages from access terminals may forward the messages to the network entity, extract information from the messages, and forward the information to the network entity, or forward the information in some other manner.

The information received at block 202 may take different forms in different implementations. Several examples follow. In some aspects, the information may comprise at least one of: measurement report messages sent by the access terminals; cell update messages sent by the access terminals; or registration messages sent by the access terminals. In some aspects, the information may comprise at least one of: path loss information; cell update count information; or registration count information.

As represented by block 204, the access terminals are categorized based on the received information. For example, a first type of received information (e.g., measurement report messages, MRMs) may be used to identify those access terminals belonging to a first category (e.g., access points that need to be served by the access point), a second type of received information (e.g., cell updates) may be used to identify those access terminals belonging to a second category (e.g., access terminals that need to be protected from the access point), and a third type of received information (e.g., registrations) may be used to identify those access terminals belonging to a third category (e.g., access terminals not belonging to either of the first two categories).

The categorization may take different forms in different implementations. Several examples follow.

In some aspects, the categorization may comprise determining which of the access terminals sent a larger quantity of MRMs to the access point or determining, based on measurement report messages, which of the access terminals are associated with a smaller path loss to the access point. For example, the access terminals that sent the most MRMs (e.g., based on a defined percentage or threshold number) may be designated category one access terminals.

In some aspects, the categorization may comprise determining which of the access terminals sent a larger quantity of cell update (CU) messages associated with radio link failure to the access point. For example, the access terminals that sent the most CU messages (e.g., based on a defined percentage or threshold number), where the CU messages comprise a cause value of radio link failure (RLF), may be designated category two access terminals.

In some aspects, the categorization may comprise identifying at least a first category of the access terminals and a second category of the access terminals. Here, the first category may be based on a quantity of measurement report messages sent to the access point or on a path loss to the access point derived from the measurement report messages, and the second category may be based on a quantity of cell update messages sent to the access point (e.g., where the cell update messages are associated with radio link failure). In some aspects, the categorization may further comprise identifying a third category of the access terminals that comprises access terminals that are not in the first category or the second category.

In some aspects, the categorization may comprise identifying a first subset of the access terminals that most frequently obtain service from the access point. For example, the access terminals that obtain service from the access point most frequently (e.g., based on a defined percentage or threshold number) may be designated category one access terminals.

In some aspects, the categorization may comprise identifying a second subset of the access terminals that obtain service from at least one neighbor access point of the access point. For example, access terminals that frequently obtain service from one or more neighbor access points (e.g., based on a defined percentage or threshold number) may be designated category two access terminals.

In some aspects, the categorization may comprise identifying a first subset of the access terminals to be provided a target level of service by the access point. For example, the access terminals that need a given level of service from the access point may be designated category one access terminals.

In some aspects, the categorization may comprise identifying a second subset of the access terminals to be protected from interference from the access point. For example, the access terminals that are close to but not served by the access point may be designated category two access terminals.

As represented by block 206, transmit power for the access point is determined based on the categorization of the access terminals. For example, a transmit power may be selected to satisfy competing factors such as providing a target level of coverage for category one access terminals while protecting category two access terminals.

The type of transmit power determined at block 206 may take different forms in different implementations. For example, the transmit power may comprise total transmit power, reference transmit power (e.g., pilot transmit power) that is used to specify other transmit powers, maximum transmit power, or some other type of transmit power.

The manner in which transmit power is determined may differ in different implementations. Several examples follow.

In some aspects, the determination of the transmit power may be based on a quantity of cell updates sent from at least one of the access terminals to the access point. As discussed herein, cell updates that are associated with radio link failure may be of particular interest. For example, the transmit power may be adjusted downward in the event one or more access terminals have sent a relatively large number of cell updates to the access point indicating that the access terminals experienced RLF when connected to the access point.

In some aspects, the determination of the transmit power may be based on a first type of the information (from block 202) associated with a first category of the access terminals, and a second type of the information associated with a second category of the access terminals. In some aspects, the first type of the information may comprise path loss information, and the second type of the information may comprise cell update count information. In some aspects, the first category of the access terminals may comprise access terminals that sent a larger quantity of measurement report message to the access point or access terminals that are associated with a smaller path loss to the access point, and the second category of the access terminals may comprise access terminals that sent a larger quantity of cell update messages associated with radio link failure to the access point.

In some aspects, the determination of the transmit power may comprise: determining a nominal transmit power that provides a target signal quality for a target coverage range, wherein the determination of the nominal transmit power is based on a first subset of the information associated with a first category of the access terminals; and adjusting the nominal transmit power based on a second subset of the information associated with a second category of the access terminals. In this case, the first subset of the information may comprise path loss information; the second subset of the information may comprise cell update count information; the first category of the access terminals may comprise access terminals that sent a larger quantity of measurement report message to the access point or access terminals that are associated with a smaller path loss to the access point; and the second category of the access terminals may comprise access terminals that sent a larger quantity of cell update messages associated with radio link failure to the access point.

In some aspects, the determination of the transmit power may comprise: determining a nominal transmit power that provides a target signal quality for a target coverage range, wherein the determination of the nominal transmit power is based on path loss information associated with a first category of the access terminals that sent a larger quantity of measurement report message to the access point; and adjusting the nominal transmit power based on registration information associated with a third category of the access terminals that is mutually exclusive of the first category of access terminals and mutually exclusive of a second category of the access terminals that sent a larger quantity of cell update messages associated with radio link failure to the access point.

Figure 3:
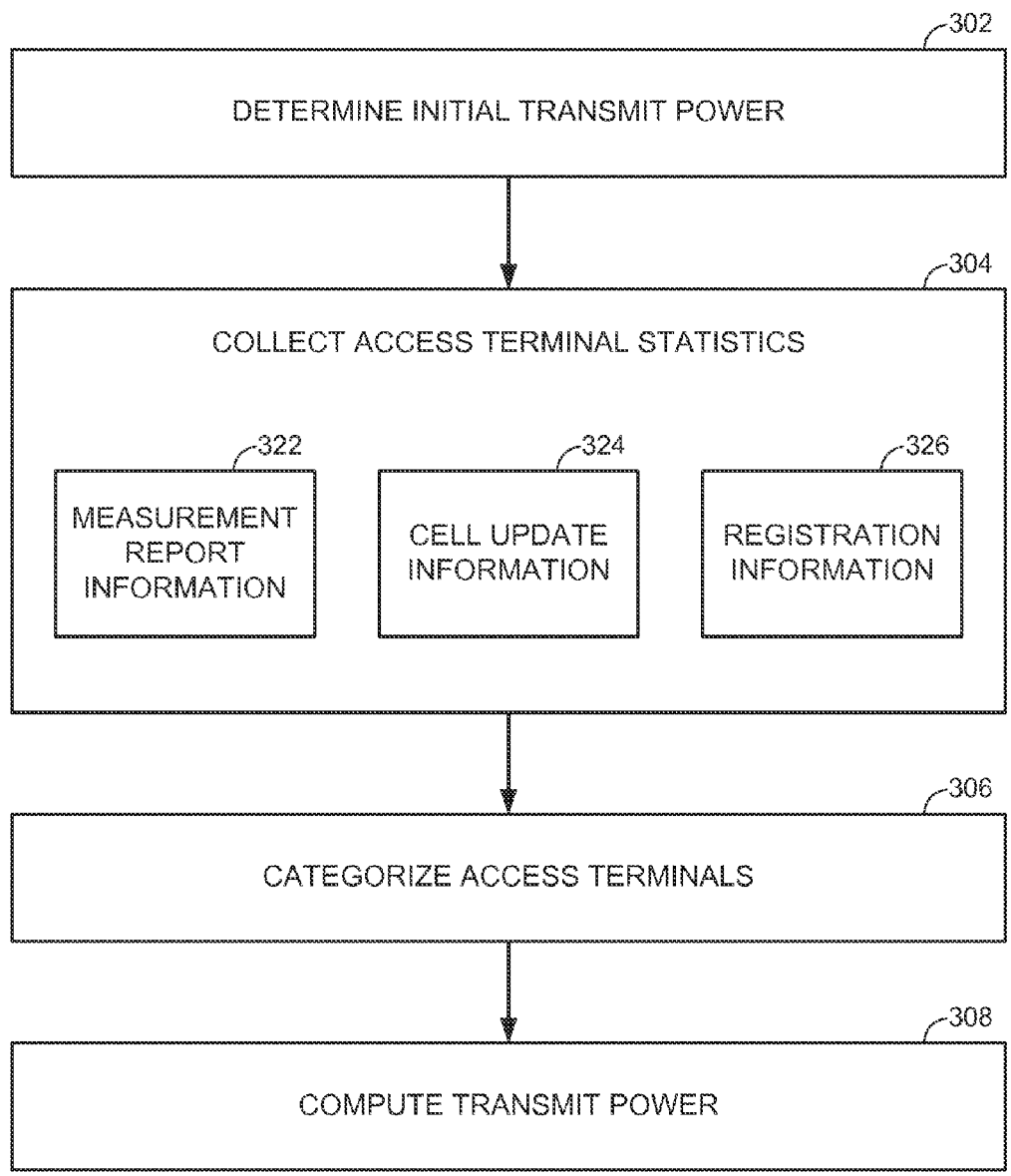
FIG. 3 is flowchart of several sample aspects of operations that may be performed in conjunction with a transmit power algorithm.

FIG. 3 illustrates a more comprehensive example of a transmit power control scheme implemented in accordance with the teachings herein. Again, these operations may be performed by an access point, or some other suitable entity, in conjunction with determining transmit power for the access point.

As represented by block 302, initial transmit power for an access point is determined. For example, this operation may be invoked when an access point is powered-up or reset so that the access point will transmit at an initial (e.g., relatively safe, yet effective) power level. This can either be a fixed power level (e.g., maximum power) or a power level determined using an initial power calibration algorithm (e.g., Network Listen based Power Calibration).

The operations of blocks 304-308 are then invoked on a repeated (e.g., periodic) basis to calibrate (e.g., adjust) the transmit power based on network conditions. For example, at the end of every designated period, an update of the transmit power is determined and applied to the RF transmitter for the access point. This periodic operation may either continue until the access point is turned off or rebooted. Alternatively, only a configurable number of calibration periods may be invoked.

As represented by block 304, access terminal (e.g., UE) statistics are collected based on received information. In an example implementation, the following three types of UE statistics are collected. Measurement report information statistics 322 are collected from MRMs issued by UEs that are in an active call with the access point. Cell update information statistics 324 are collected for those cell updates on the access point with cause value=radio link failure (RLF). In addition, UE registration information statistics 326 based on access terminal registrations on the access point are collected.

As represented by block 306, the access terminals (e.g., UEs) associated with an access point are categorized based on the statistics from block 304. In an example implementation, three UE categories are defined based on the three criteria that follow.

The first category is designated HUE since the access terminals in this category may be thought of as the Home UEs (HUEs) for the access point (even though in open access mode, there are no true HUEs). This is the top $N_{HUE}$ (or less) UEs that have the most MRM reports in the HUE database. Each HUE also may need to satisfy a criterion (Threshold$_{MRM}$) regarding the minimum number of MRM reports needed to qualify as an HUE.

The second category is designated PUE since the access terminals in this category are those that need to be "protected" from transmission by the access point. This is the top $N_{PUE}$ (or less) UEs that have the most Cell Update (CU) messages in the CU database. Each PUE also may need to satisfy a criterion (Threshold$_{CU}$) regarding the minimum number of CU messages needed to qualify as a PUE.

The third category is designated MUE since the access terminals in this category may be considered to be macro UEs (MUEs). This category may include all other access terminals that are not in HUE or PUE category.

As represented by block 308, transmit power is then computed based on the categorization of block 306. In an example implementation, a power update procedure is performed using the HUE, PUE, MUE statistics, when applicable. In a first aspect of the procedure using the HUE reports, coverage range is estimated, RF mismatch correction is performed, and a nominal transmit power value is calculated. In a second aspect of the procedure, the transmit power is updated based on the PUE and/or MUE statistics and based on the nominal transmit power.

Figure 4:
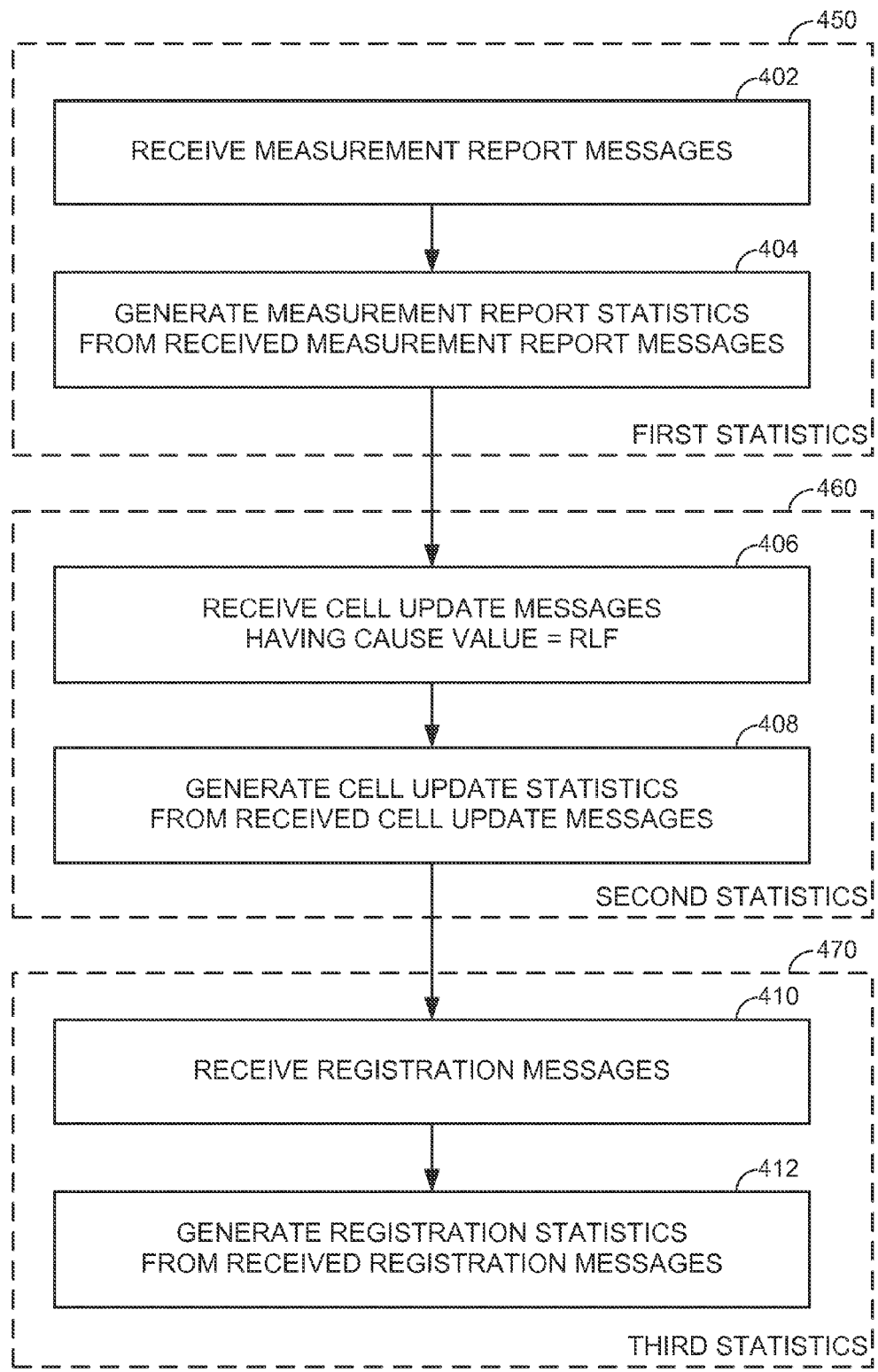
FIG. 4 is flowchart of several sample aspects of operations that may be performed in conjunction with generating statistics based on received messages.

FIG. 4 illustrates an example of operations that may be performed in conjunction with generating statistics based on received information. As discussed herein, these operations may be performed on a repeated (e.g., periodic) basis. In this example, three types of statistics are generated, including first statistics 450, second statistics 460, and third statistics 470. It should be appreciated that no ordering is implied by the numerical designations or their depict sequencing in FIG. 4, as the different statistics may be determined in any order or in no order (e.g., in parallel). It should also be appreciated that different statistic types and/or a different number of statistic types may be generated in other implementations.

As represented by block 402, MRMs from access terminals that are in active call with an access point are received. Various information extracted from the MRMs may be obtained for later power update usage. For example, an access terminal identifier (e.g., international mobile subscriber identity, IMSI) associated with each MRM may be obtained. In addition, path loss information included in each MRM may be obtained. In some scenarios, the collection of information from MRMs of a given access terminal may be stopped. For example, if the duration of an active call for the access terminal exceeds a threshold time limit, collection may be stopped until the call ends.

As represented by block 404, measurement report statistics are generated from the MRMs received at block 402. These statistics are then stored in a database for subsequent use. For example, the number of received MRMs may be tallied. In scenarios where access terminal identifiers are also acquired at block 402, the number of MRMs received from each access terminal may be tallied. Also, the magnitude of each reported path loss (e.g., in dB) between the access point and the access terminal may be recorded.

As represented by block 406, cell update messages having cause value=RLF are received. Various information associated with the cell update messages may be acquired for later power update usage. For example, an access terminal identifier of each access terminal that sent each cell update message may be obtained. Here, after receiving a cell update message from an access terminal, an access point may send a message to the access terminal requesting an identifier of the access terminal. Also, the transmit power being used at the time a cell update message was received may be recorded.

As represented by block 408, cell update statistics are generated from the cell update messages received at block 406. These statistics are then stored in a database for subsequent use. For example, the number of received cell update messages may be tallied. In scenarios where access terminal identifiers are also acquired at block 406, the number of cell update messages received from each access terminal may be tallied.

In some implementations, cell update statistics are not maintained for access terminals that have been categorized as category one access terminals (e.g., HUEs). As discussed herein, a different category of access terminals (e.g., PUEs) may be defined based on cell update statistics. Given the potential conflicts between these categories (e.g., in terms of how transmit power is set), it is generally desirable to define the first and second categories of access terminals so that they are mutually exclusive.

As represented by block 410, registration messages (e.g., RRC Connection Request messages) are received. Various information associated with the registration messages may be obtained for later power update usage. For example, an access terminal identifier associated with each registration message may be obtained. In addition, the transmit power being used at the time a registration message was received may be recorded.

In some implementations, path loss information (e.g., path loss from the access terminal to the access point) included in a registration message may be recorded. This information may indicate, for example, the size of the coverage area (e.g., the coverage footprint) of the access point.

As represented by block 412, registration statistics are generated from the registration messages received at block 410. These statistics are then stored in a database for subsequent use. For example, the number of received registration messages may be tallied. In scenarios where access terminal identifiers are also acquired at block 410, the number of registration messages received from each access terminal may be tallied. Also, the magnitude of any reported path loss between the access point and the access terminal may be recorded.

In some implementations, registration statistics are not maintained for access terminals that have been categorized as category one access terminals (e.g., HUEs) or category two access terminals (e.g., PUEs). For example, registration statistics might only be collected for MUEs.

Figure 5:
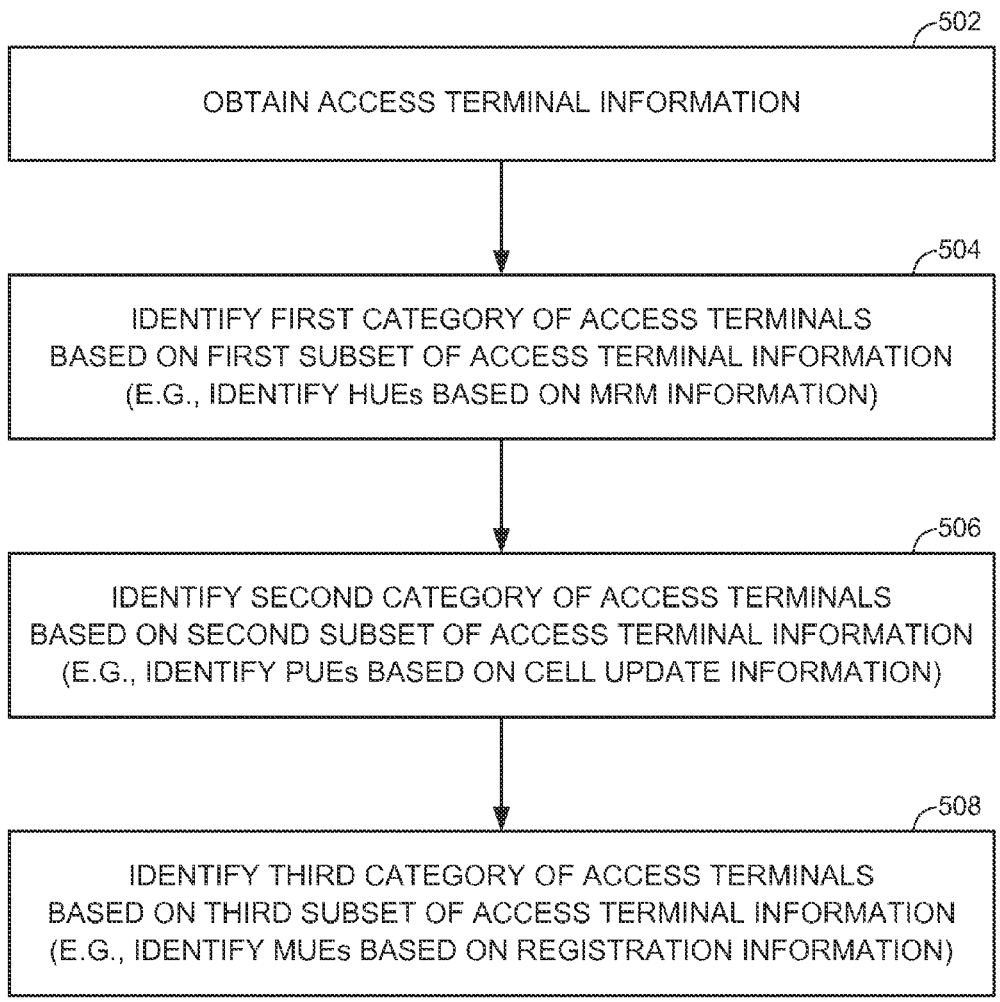
FIG. 5 is flowchart of several sample aspects of operations that may be performed in conjunction with categorizing access terminals.

FIG. 5 illustrates an example of operations that may be performed in conjunction with categorizing access terminals. As discussed herein, these operations may be performed on a repeated (e.g., periodic) basis. In this example, three types of categories are defined. It should be appreciated that different category types and/or a different number of category types may be generated in other implementations.

As represented by block 502, access terminal information that is used for the categorization of the access terminals is obtained. For example, the operations of block 502 may correspond to the operations of FIG. 4.

As represented by block 504, a first category of access terminals is identified based on a first subset of the access terminal information obtained at block 502. In some implementations, a set of HUEs is identified based on MRM information acquired via received MRMs. For example, assuming there are "N" unique IMSIs in an MRM report database, a descending sort of these "N" IMSIs is performed based on the number of MRMs associated with each IMSI. The top "X" IMSIs may then be selected. The top "X" IMSIs may be qualified in various ways. For example, any number of IMSIs having a number of MRMs that exceeds a threshold may be selected. As another example, a certain percentage (e.g., the top 15%) of the IMSIs may be selected. As yet another example, "X" may be a defined number.

In some implementations, a decision as to whether a given IMSI is to be categorized as a HUE may be based on the path loss to the corresponding access terminal. For example, in some cases, only those IMSIs associated with a path loss that is less than or equal to a threshold path loss are designated as HUEs.

As represented by block 506, a second category of access terminals is identified based on a second subset of the access terminal information obtained at block 502. In some implementations, a set of PUEs is identified based on cell update information acquired via received cell update messages. For example, assuming there are "N" unique IMSIs in a PUE report database, a descending sort of these "N" IMSIs is performed based on the number of cell updates associated with each IMSI. The top "X" IMSIs may then be selected. The top "X" IMSIs may be qualified in various ways. For example, any number of IMSIs having a number of cell updates that exceeds a threshold may be selected. As another example, a certain percentage (e.g., the top 15%) of the IMSIs may be selected. As yet another example, "X" may be a defined number.

As discussed above, the set of HUEs and the set of PUEs may be mutually exclusive. Thus, a check may be performed to determine whether of the IMSIs identified based on the PUE report database have already been characterized as HUEs. If so, these HUE IMSIs would not be included in the PUE category.

As represented by block 508, a third category of access terminals is identified based on a third subset of the access terminal information obtained at block 502. In some implementations, a set of MUEs is identified based on registration information acquired via received registration messages. For example, all of the IMSIs associated with received registration or other types of messages (e.g., MRMs and cell update messages) that have not been categorized under the first category (e.g., HUE) or the second category (e.g., PUE) may be assigned to the third category (e.g., MUE)

Figure 6:
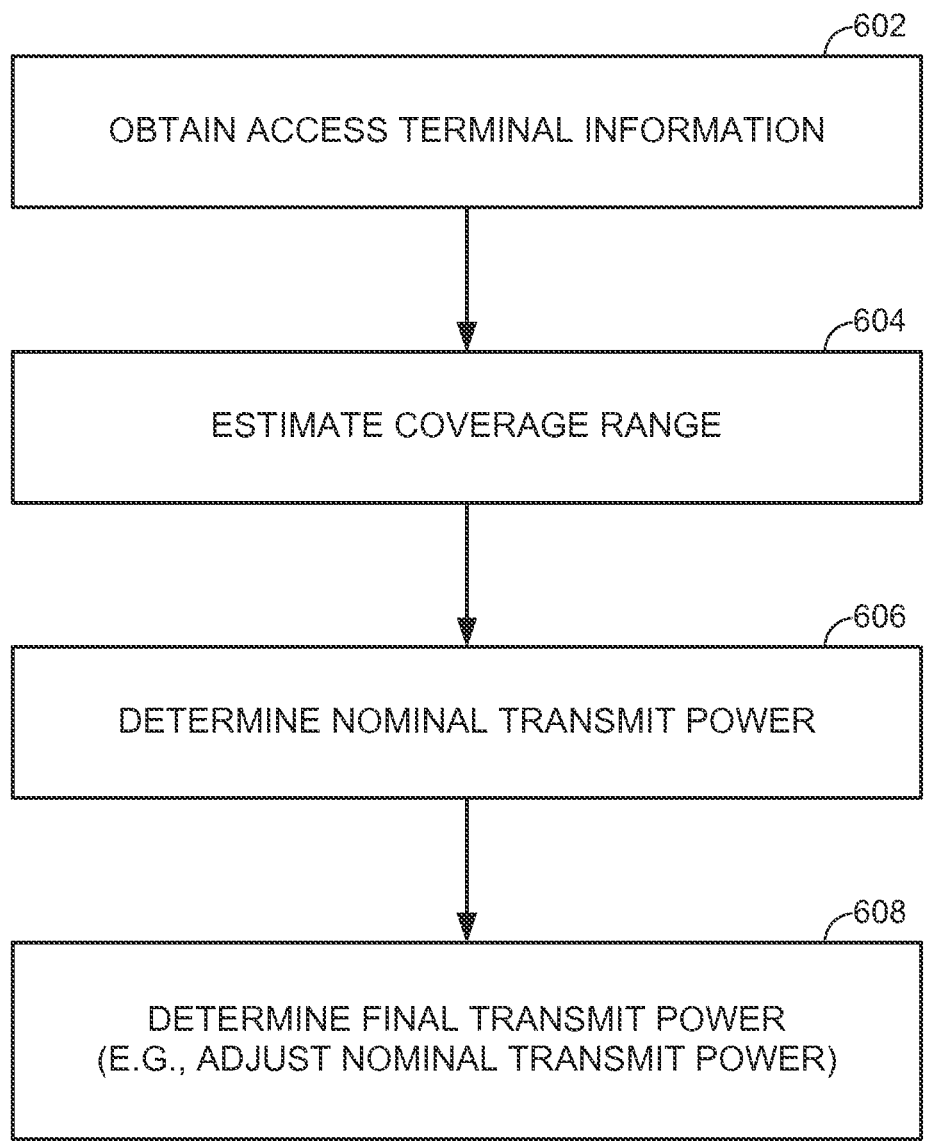
FIG. 6 is flowchart of several sample aspects of operations that may be performed in conjunction with determining transmit power.

FIG. 6 illustrates an example of operations that may be performed in conjunction with determining the transmit power to be used by an access point.

As represented by block 602, access terminal information such as path loss information, the number of cell update messages, the number of registrations, and the categorization of the access terminals is obtained. For example, the operations of block 602 may correspond to the operations of FIGS. 4 and 5.

As represented by block 604, a target coverage range is estimated. For example, a target path loss may be determined by determining what path loss value will provide coverage for "X" percent (e.g., 95%) of the HUEs. This target path loss may be obtained, for example, from the MRM path loss information for the HUEs (e.g., by application of a cumulative distribution function on the HUE path loss values).

As represented by block 606, a nominal (e.g., preliminary) transmit power is determined based on the target coverage range computed at block 604. In some aspects, this operation may involve determining the transmit power needed to achieve a target signal quality (e.g., signal-to-noise ratio) at the edge of the target coverage range. In some aspects, this operation may account for potential leakage into adjacent channels. For example, if it is determined that a transmit power calculated to meet the target coverage requirement will cause too much adjacent channel interference, adjacent channel protection may be employed whereby the transmit power is adjusted downward to some degree.

As represented by block 608, a final transmit power is determined. For example, the nominal transmit power calculated at block 606 may be adjusted upward or downward depending on current or past conditions (e.g., as indicated by the access terminal information obtained at block 602). An example of an algorithm that takes these factors into account follows.

In a first part of the algorithm, a determination is made as to whether the number of received cell update messages is greater than or equal to a threshold. In various implementations, this determination may be based on the total number of cell update messages (e.g., irrespective of which access terminals sent the messages) and/or based on the number of cell update messages sent by individual access terminals (e.g., whether a threshold number of access terminals sent the threshold number of cell update messages).

If the threshold condition is met, the nominal transmit power may be reduced in an effort to mitigate interference to the access terminals that sent these cell update messages (e.g., the access terminals that experienced RLF). The manner in which the transmit power is adapted may differ in different implementations. In some cases, the transmit power is reduced by a pre-defined value. In some cases, the magnitude of the reduction in transmit power is based on the degree to which the number of received cell update messages exceeds a threshold. For example, the magnitude of the power reduction will be greater in a scenario where the number of received cell update messages exceeds a threshold by a large margin as compared to a scenario where the number of received cell update messages exceeds a threshold by a lesser margin. In cases where the number of cell update messages are maintained on an access terminal basis, the magnitude of the reduction in transmit power may be based on how many of the access terminals have received a quantity of cell update messages that exceeds a threshold.

A second part of the algorithm may be invoked if the first part of the algorithm does not result in a reduction of the nominal transmit power. For example, if the cell update message limit is not reached (e.g., the number of received cell update messages does not exceed a threshold), a check may be performed in the second part of the algorithm to determine whether the transmit power may be adjusted upward or downward based on some other factor or factors.

As an example of the second part of the algorithm, a determination as to whether power can be increased or needs to be decreased may be made based on registration statistics. For example, a determination is made as to whether the number of received registration messages is less than or equal to a threshold. In various implementations, this determination may be based on the total number of registration messages (e.g., irrespective of which access terminals sent the messages) and/or based on the number of registration messages sent by individual access terminals (e.g., whether less than a threshold number of access terminals sent the threshold number of registration messages).

If the threshold condition is met (e.g., the number of received registration messages is less than the threshold), the nominal transmit power may be increased since it is expected that at least some level of increase in transmit power can be achieved without significantly increasing interference to access terminals in the system. Conversely, if the threshold condition is not met (e.g., the number of received registration messages is greater than the threshold), the nominal transmit power may be reduced in an effort to mitigate interference to nearby access terminals (e.g., the access terminals that sent registration messages).

The manner in which the transmit power is adapted may differ in different implementations. In some cases, the transmit power is reduced by a pre-defined value. In some cases, the magnitude of the reduction in transmit power is based on the degree to which the number of received registration messages falls below or exceeds a threshold. For example, the magnitude of the power increase will be greater in a scenario where the number of received registration messages falls below a threshold by a large margin as compared to a scenario where the number of received registration messages falls below a threshold by a lesser margin. As another example, the magnitude of the power reduction will be greater in a scenario where the number of received registration messages exceeds a threshold by a large margin as compared to a scenario where the number of received registration messages exceeds a threshold by a lesser margin. In cases where the number of registration messages are maintained on an access terminal basis, the magnitude of the increase (or decrease) in transmit power may be based on how many of the access terminals have received a quantity of registration messages that fall below (or exceeds) a threshold.

In some aspects, the magnitude of a transmit power adjustment may be based on path loss information. For example, if the path loss distance of most MUEs (e.g., 95%) to the access point is at least 100 dB, and the target coverage range (for the HUEs) is 80 dB, then it should be safe to increase transmit power by 20 dB since this increase in power will generally only affect a small number of the MUEs (e.g., 5%).

Figure 7:
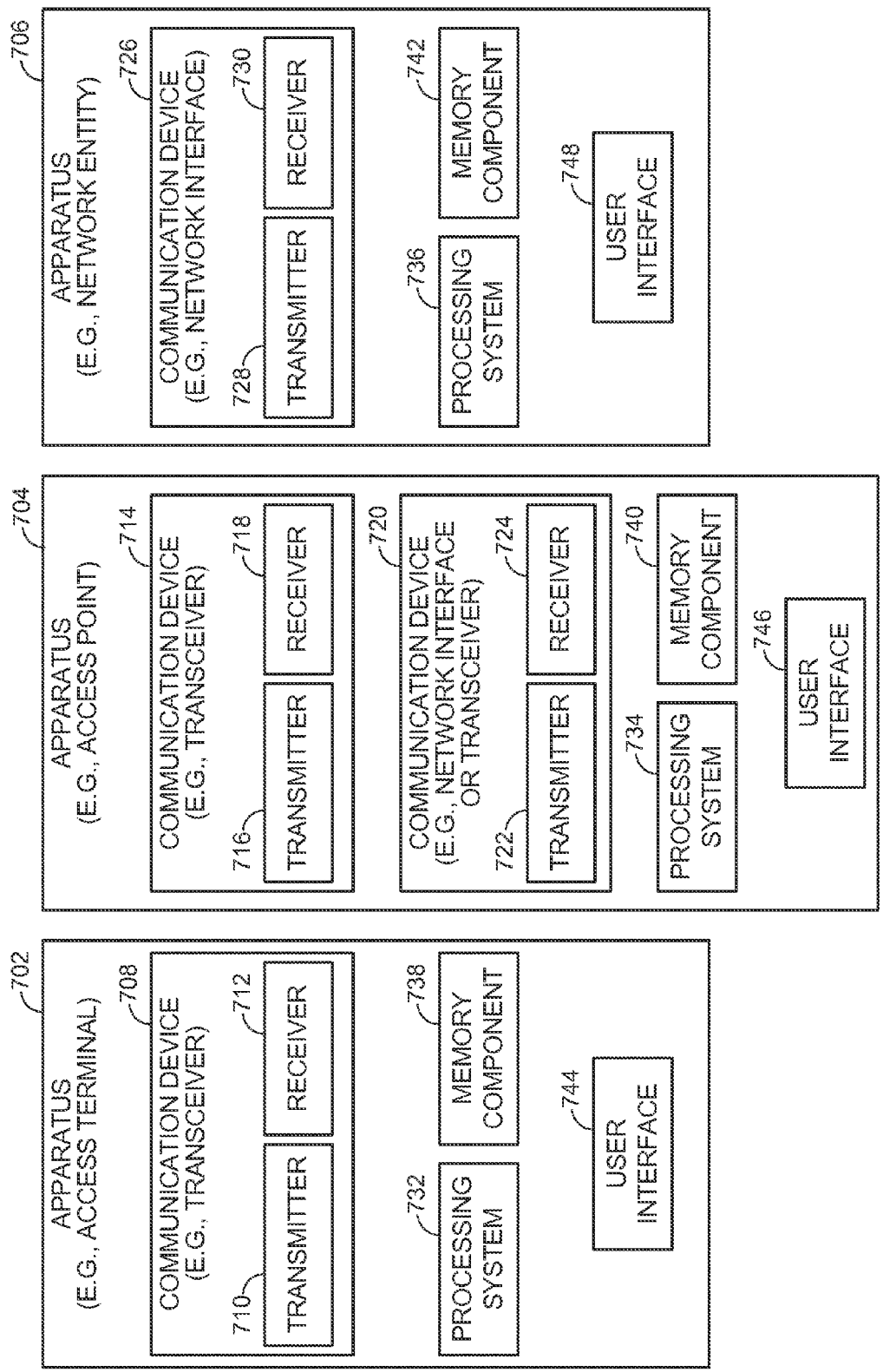
FIG. 7 is a simplified block diagram of several sample aspects of components that may be employed in communication nodes.

FIG. 7 illustrates several sample components (represented by corresponding blocks) that may be incorporated into an apparatus 702, an apparatus 704, and an apparatus 706 (e.g., corresponding to an access terminal, an access point, and a network entity, respectively) to support transmit power control operations as taught herein. It should be appreciated that these components may be implemented in different types of apparatuses in different implementations (e.g., in an ASIC, in an SoC, etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 702 and the apparatus 704 each include at least one wireless communication device (represented by the communication devices 708 and 714 (and the communication device 720 if the apparatus 704 is a relay)) for communicating with other nodes via at least one designated radio access technology. Each communication device 708 includes at least one transmitter (represented by the transmitter 710) for transmitting and encoding signals (e.g., messages, indications, information, and so on) and at least one receiver (represented by the receiver 712) for receiving and decoding signals (e.g., messages, indications, information, pilots, and so on). Similarly, each communication device 714 includes at least one transmitter (represented by the transmitter 716) for transmitting signals (e.g., messages, indications, information, pilots, and so on) and at least one receiver (represented by the receiver 718) for receiving signals (e.g., messages, indications, information, and so on). If the apparatus 704 is a relay access point, each communication device 720 may include at least one transmitter (represented by the transmitter 722) for transmitting signals (e.g., messages, indications, information, pilots, and so on) and at least one receiver (represented by the receiver 724) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 704 comprises a network listen module.

The apparatus 706 (and the apparatus 704 if it is not a relay access point) includes at least one communication device (represented by the communication device 726 and, optionally, 720) for communicating with other nodes. For example, the communication device 726 may comprise a network interface that is configured to communicate with one or more network entities via a wire-based or wireless backhaul. In some aspects, the communication device 726 may be implemented as a transceiver configured to support wire-based or wireless signal communication. This communication may involve, for example, sending and receiving: messages, parameters, or other types of information. Accordingly, in the example of FIG. 7, the communication device 726 is shown as comprising a transmitter 728 and a receiver 730. Similarly, if the apparatus 704 is not a relay access point, the communication device 720 may comprise a network interface that is configured to communicate with one or more network entities via a wire-based or wireless backhaul. As with the communication device 726, the communication device 720 is shown as comprising a transmitter 722 and a receiver 724.

The apparatuses 702, 704, and 706 also include other components that may be used in conjunction with transmit power control operations as taught herein. The apparatus 702 includes a processing system 732 for providing functionality relating to, for example, generating information for transmit power control as taught herein and for providing other processing functionality. The apparatus 704 includes a processing system 734 for providing functionality relating to, for example, transmit power control as taught herein and for providing other processing functionality. The apparatus 706 includes a processing system 736 for providing functionality relating to, for example, transmit power control as taught herein and for providing other processing functionality. The apparatuses 702, 704, and 706 include memory devices 738, 740, and 742 (e.g., each including a memory device), respectively, for maintaining information (e.g., information used for power control, thresholds, parameters, and so on). In addition, the apparatuses 702, 704, and 706 include user interface devices 744, 746, and 748, respectively, for providing indications (e.g., audible and/or visual indications) to a user and/or for receiving user input (e.g., upon user actuation of a sensing device such a keypad, a touch screen, a microphone, and so on).

For convenience, the apparatus 702 is shown in FIG. 7 as including components that may be used in the various examples described herein. In practice, the illustrated blocks may have different functionality in different aspects. For example, functionality of the block 734 for the operations of FIG. 4 may be different as compared to functionality of the block 734 for supporting the operations of FIG. 5.

The components of FIG. 7 may be implemented in various ways. In some implementations, the components of FIG. 7 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 708, 732, 738, and 744 may be implemented by processor and memory component(s) of the apparatus 702 (e.g., by execution of appropriate code and/or by appropriate configuration of processor components). Similarly, some or all of the functionality represented by blocks 714, 720, 734, 740, and 746 may be implemented by processor and memory component(s) of the apparatus 704 (e.g., by execution of appropriate code and/or by appropriate configuration of processor components). Also, some or all of the functionality represented by blocks 726, 736, 742, and 748 may be implemented by processor and memory component(s) of the apparatus 706 (e.g., by execution of appropriate code and/or by appropriate configuration of processor components).

As discussed above, in some aspects the teachings herein may be employed in a network that includes macro scale coverage (e.g., a large area cellular network such as a 3G/4G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence, within a commercial building, etc.) may be referred to as a small cell. In various applications, other terminology may be used to reference a macro access point, a small cell, or other access point-type nodes. For example, a macro access point may be configured or referred to as an access node, base station, access point, eNodeB, macro cell, and so on. In some implementations, a node may be associated with (e.g., referred to as or divided into) one or more cells or sectors. A cell or sector associated with a macro access point or a small cell access point may be referred to as a macro cell or a small cell, respectively.

Figure 8:
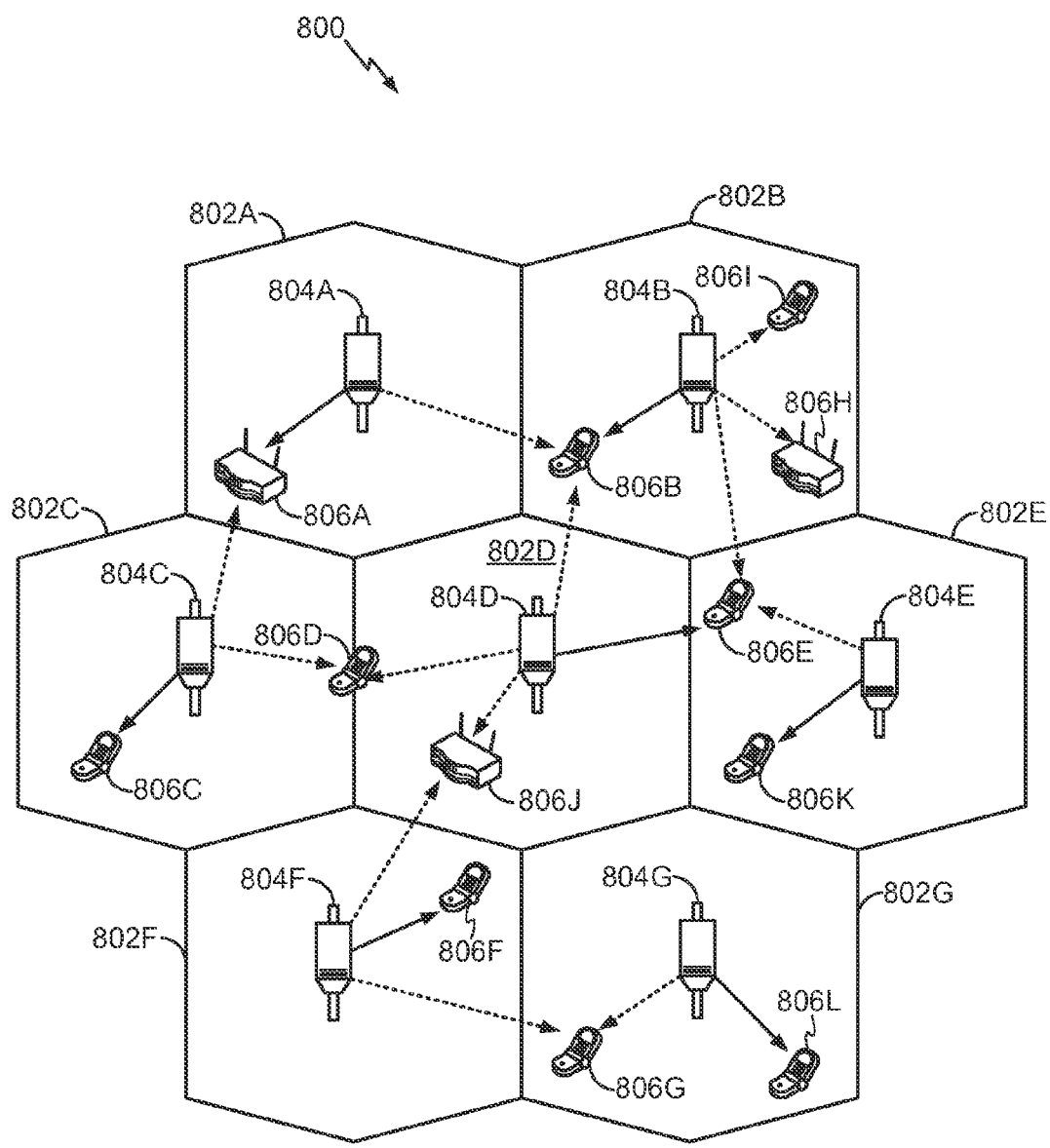
FIG. 8 is a simplified diagram of a wireless communication system.

FIG. 8 illustrates a wireless communication system 800, configured to support a number of users, in which the teachings herein may be implemented. The system 800 provides communication for multiple cells 802, such as, for example, macro cells 802A-802G, with each cell being serviced by a corresponding access point 804 (e.g., access points 804A-804G). As shown in FIG. 8, access terminals 806 (e.g., access terminals 806A-806L) may be dispersed at various locations throughout the system over time. Each access terminal 806 may communicate with one or more access points 804 on a forward link (FL) and/or a reverse link (RL) at a given moment, depending upon whether the access terminal 806 is active and whether it is in soft handoff, for example. The wireless communication system 800 may provide service over a large geographic region. For example, macro cells 802A-802G may cover a few blocks in a neighborhood or several miles in a rural environment.

Figure 9:
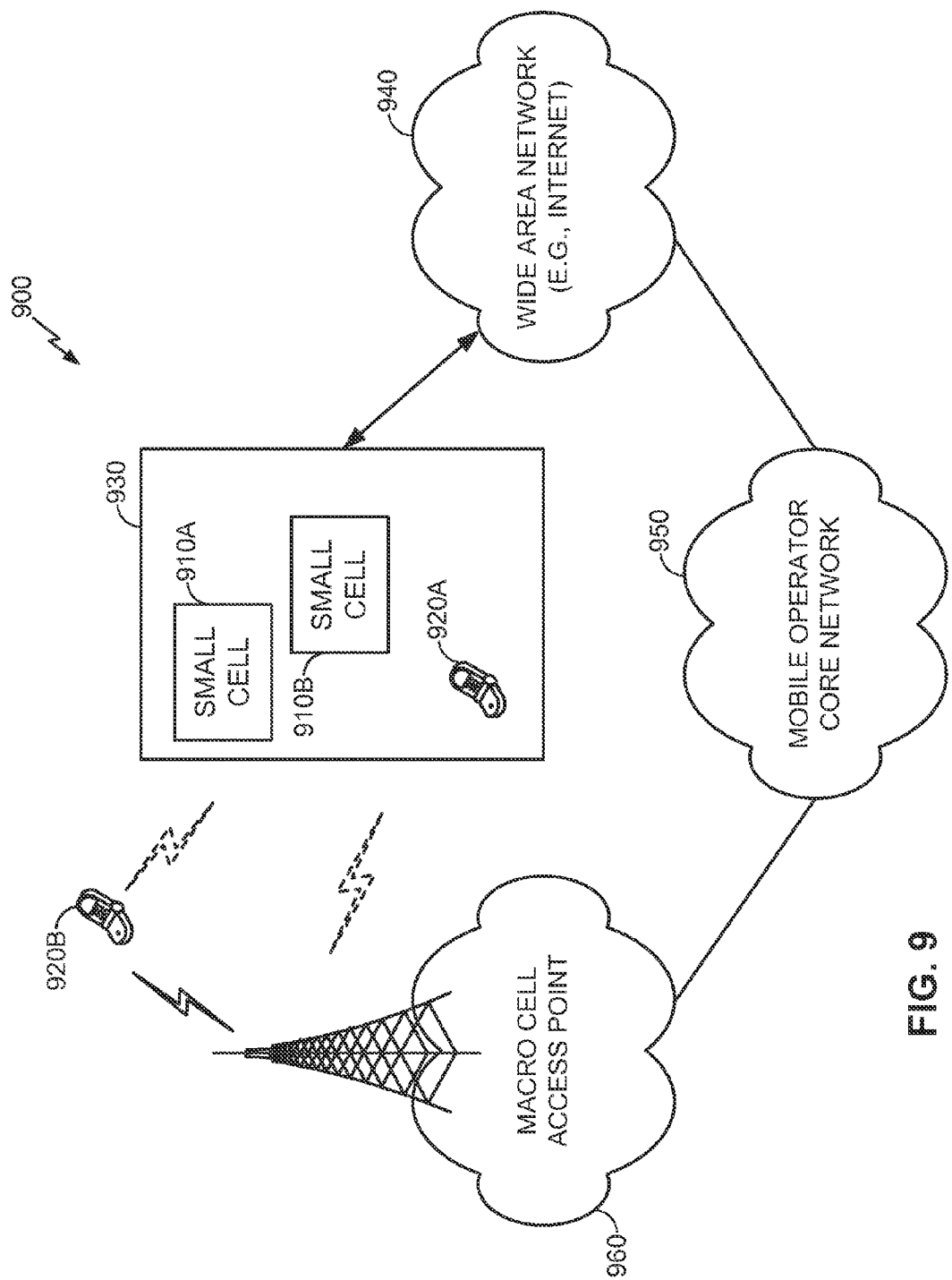
FIG. 9 is a simplified diagram of a wireless communication system including small cells.

FIG. 9 illustrates an example of a communication system 900 where one or more small cells are deployed within a network environment. Specifically, the system 900 includes multiple small cells 910 (e.g., small cells 910A and 910B) installed in a relatively small scale network environment (e.g., in one or more user residences 930). Each small cell 910 may be coupled to a wide area network 940 (e.g., the Internet) and a mobile operator core network 950 via a DSL router, a cable modem, a wireless link, or other connectivity means (not shown). As will be discussed below, each small cell 910 may be configured to serve associated access terminals 920 (e.g., access terminal 920A) and, optionally, other (e.g., hybrid or alien) access terminals 920 (e.g., access terminal 920B). In other words, access to small cells 910 may be restricted whereby a given access terminal 920 may be served by a set of designated (e.g., home) small cell(s) 910 but may not be served by any non-designated small cells 910 (e.g., a neighbor's small cell 910).

Figure 10:
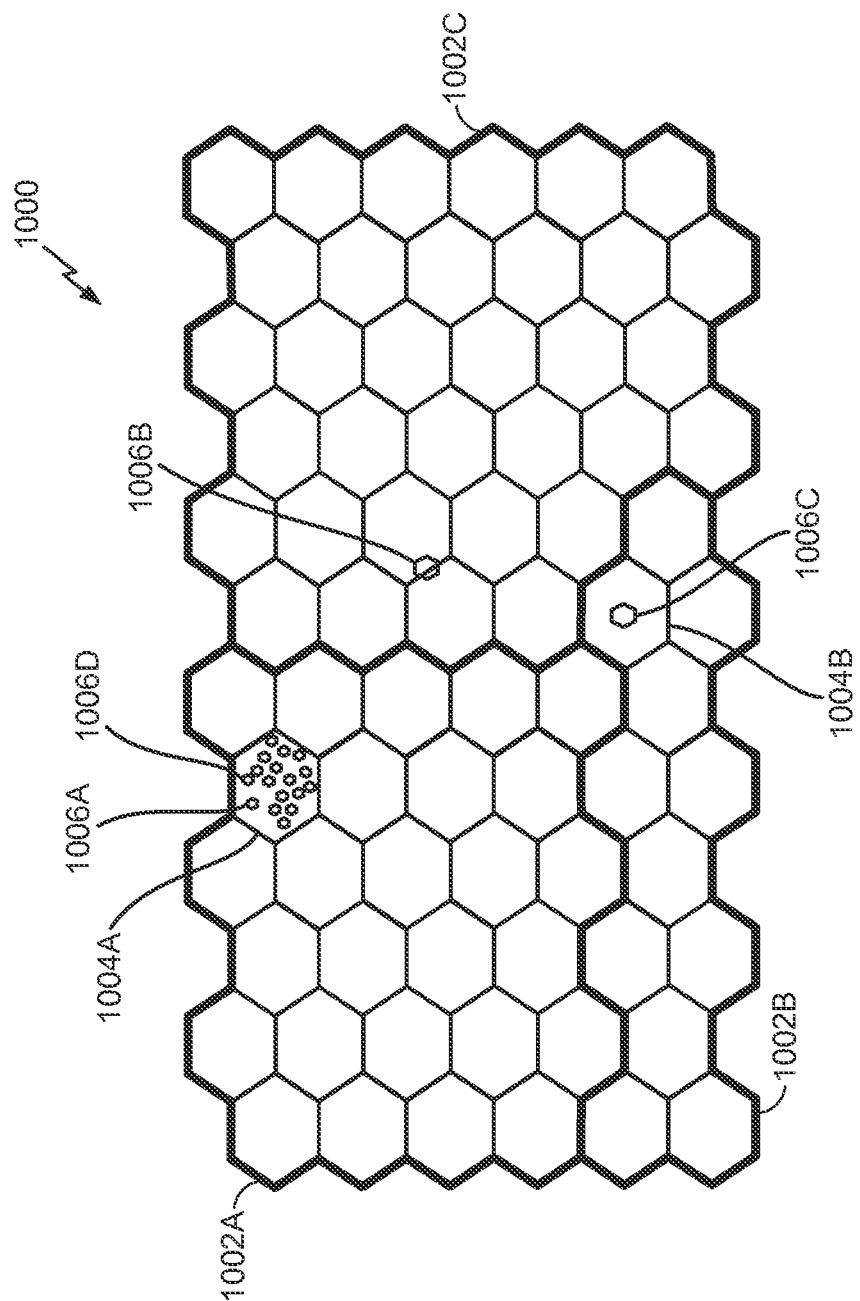
FIG. 10 is a simplified diagram illustrating coverage areas for wireless communication.

FIG. 10 illustrates an example of a coverage map 1000 where several tracking areas 1002 (or routing areas or location areas) are defined, each of which includes several macro coverage areas 1004. Here, areas of coverage associated with tracking areas 1002A, 1002B, and 1002C are delineated by the wide lines and the macro coverage areas 1004 are represented by the larger hexagons. The tracking areas 1002 also include small cell coverage areas 1006. In this example, each of the small cell coverage areas 1006 (e.g., small cell coverage areas 1006B and 1006C) is depicted within one or more macro coverage areas 1004 (e.g., macro coverage areas 1004A and 1004B). It should be appreciated, however, that some or all of a small cell coverage area 1006 might not lie within a macro coverage area 1004. In practice, a large number of small cell coverage areas 1006 (e.g., small cell coverage areas 1006A and 1006D) may be defined within a given tracking area 1002 or macro coverage area 1004.

Referring again to FIG. 9, the owner of a small cell 910 may subscribe to mobile service, such as, for example, 3G/4G mobile service, offered through the mobile operator core network 950. In addition, an access terminal 920 may be capable of operating both in macro environments and in smaller scale (e.g., residential) network environments. In other words, depending on the current location of the access terminal 920, the access terminal 920 may be served by a macro cell access point 960 associated with the mobile operator core network 950 or by any one of a set of small cells 910 (e.g., the small cells 910A and 910B that reside within a corresponding user residence 930). For example, when a subscriber is outside his home, he is served by a standard macro access point (e.g., access point 960) and when the subscriber is at home, he is served by a small cell (e.g., small cell 910A). Here, a small cell 910 may be backward compatible with legacy access terminals 920.

A small cell 910 may be deployed on a single frequency or, in the alternative, on multiple frequencies. Depending on the particular configuration, the single frequency or one or more of the multiple frequencies may overlap with one or more frequencies used by a macro access point (e.g., access point 960).

In some aspects, an access terminal 920 may be configured to connect to a preferred small cell (e.g., the home small cell of the access terminal 920) whenever such connectivity is possible. For example, whenever the access terminal 920A is within the user's residence 930, it may be desired that the access terminal 920A communicate only with the home small cell 910A or 910B.

In some aspects, if the access terminal 920 operates within the macro cellular network 950 but is not residing on its most preferred network (e.g., as defined in a preferred roaming list), the access terminal 920 may continue to search for the most preferred network (e.g., the preferred small cell 910) using a better system reselection (BSR) procedure, which may involve a periodic scanning of available systems to determine whether better systems are currently available and subsequently acquire such preferred systems. The access terminal 920 may limit the search for specific band and channel. For example, one or more small cell channels may be defined whereby all small cells (or all restricted small cells) in a region operate on the small cell channel(s). The search for the most preferred system may be repeated periodically. Upon discovery of a preferred small cell 910, the access terminal 920 selects the small cell 910 and registers on it for use when within its coverage area.

Access to a small cell may be restricted in some aspects. For example, a given small cell may only provide certain services to certain access terminals. In deployments with so-called restricted (or closed) access, a given access terminal may only be served by the macro cell mobile network and a defined set of small cells (e.g., the small cells 910 that reside within the corresponding user residence 930). In some implementations, an access point may be restricted to not provide, for at least one node (e.g., access terminal), at least one of: signaling, data access, registration, paging, or service.

In some aspects, a restricted small cell (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., small cells) that share a common access control list of access terminals.

Various relationships may thus exist between a given small cell and a given access terminal. For example, from the perspective of an access terminal, an open small cell may refer to a small cell with unrestricted access (e.g., the small cell allows access to any access terminal). A restricted small cell may refer to a small cell that is restricted in some manner (e.g., restricted for access and/or registration). A home small cell may refer to a small cell on which the access terminal is authorized to access and operate on (e.g., permanent access is provided for a defined set of one or more access terminals). A hybrid (or guest) small cell may refer to a small cell on which different access terminals are provided different levels of service (e.g., some access terminals may be allowed partial and/or temporary access while other access terminals may be allowed full access). An alien small cell may refer to a small cell on which the access terminal is not authorized to access or operate on, except for perhaps emergency situations (e.g., 911 calls).

From a restricted small cell perspective, a home access terminal may refer to an access terminal that is authorized to access the restricted small cell installed in the residence of that access terminal's owner (usually the home access terminal has permanent access to that small cell). A guest access terminal may refer to an access terminal with temporary access to the restricted small cell (e.g., limited based on deadline, time of use, bytes, connection count, or some other criterion or criteria). An alien access terminal may refer to an access terminal that does not have permission to access the restricted small cell, except for perhaps emergency situations, for example, such as 911 calls (e.g., an access terminal that does not have the credentials or permission to register with the restricted small cell).

For convenience, the disclosure herein describes various functionality in the context of a small cell. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
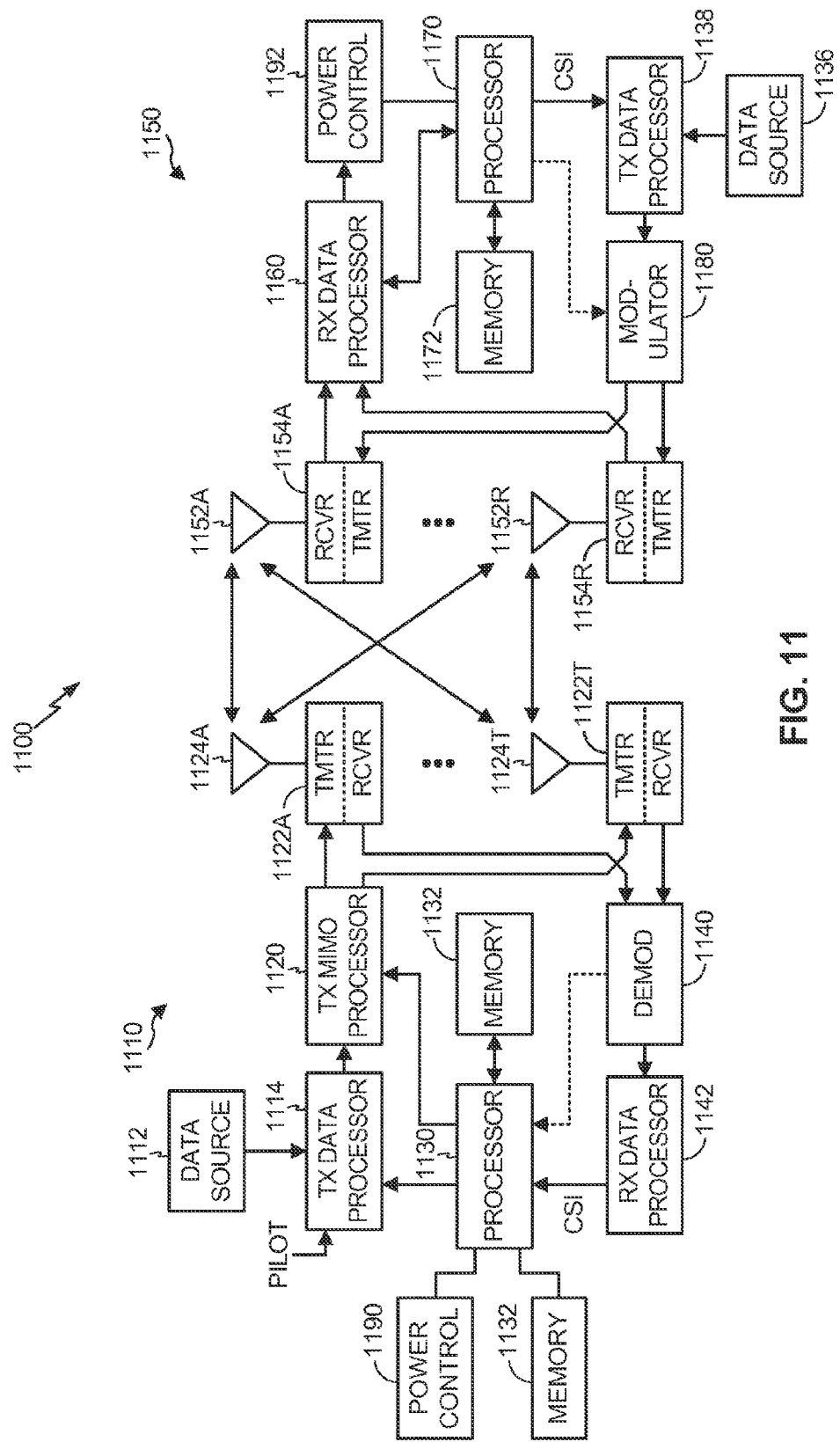
FIG. 11 is a simplified block diagram of several sample aspects of communication components.

FIG. 11 illustrates a wireless device 1110 (e.g., an access point) and a wireless device 1150 (e.g., an access terminal) of a sample MIMO system 1100. At the device 1110, traffic data for a number of data streams is provided from a data source 1112 to a transmit (TX) data processor 1114. Each data stream may then be transmitted over a respective transmit antenna.

The TX data processor 1114 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the device 1150, the transmitted modulated signals are received by $N_R$ antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

FIG. 11 also illustrates that the communication components may include one or more components that perform transmit power control operations as taught herein. For example, a power component 1190 may cooperate with the processor 1130 and/or other components of the device 1110 to control transmit power as taught herein. Similarly, a power control component 1192 may cooperate with the processor 1170 and/or other components of the device 1150 to provide information for controlling transmit power as taught herein. It should be appreciated that for each device 1110 and 1150 the functionality of two or more of the described components may be provided by a single component. For example, a single processing component may provide the functionality of the power control component 1190 and the processor 1130 and a single processing component may provide the functionality of the power control component 1192 and the processor 1170.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a small cell, or some other similar terminology.

In some aspects, a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects, the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims.

Figure 12:
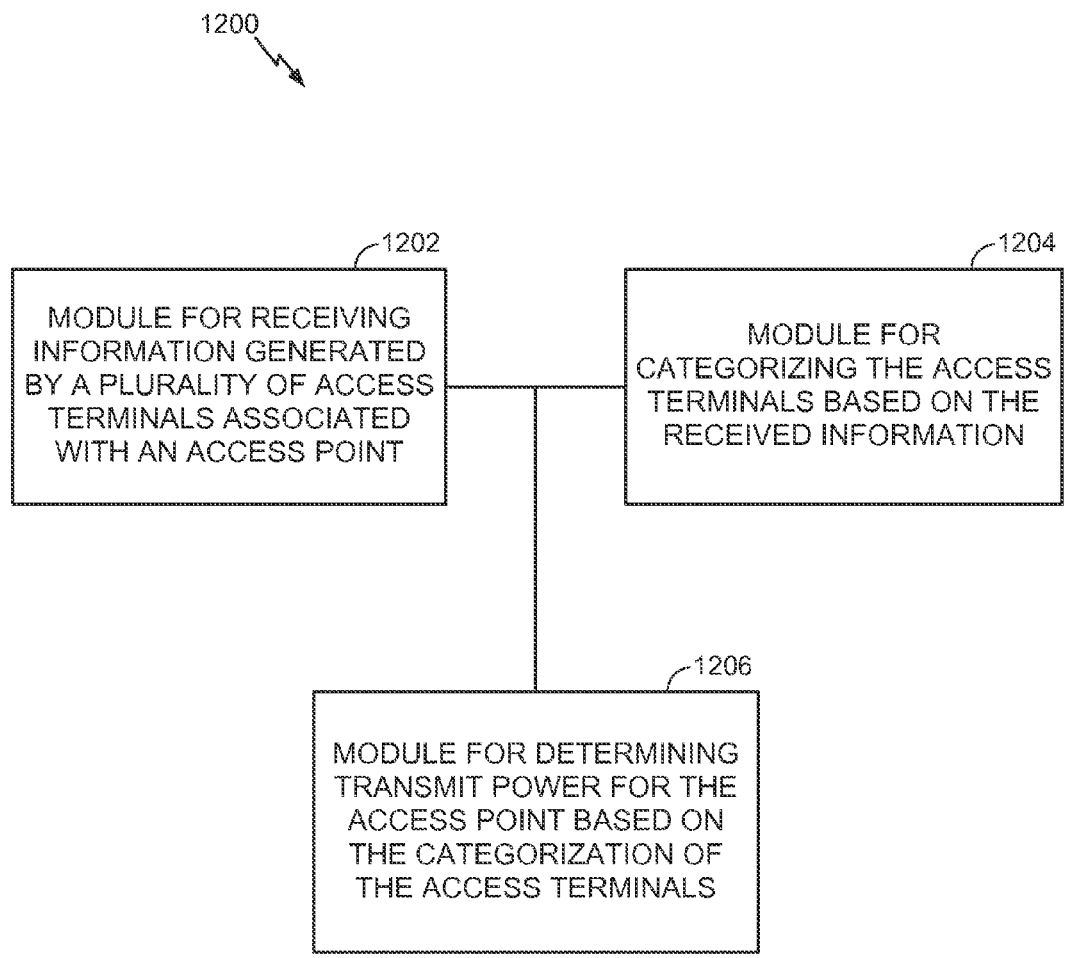
FIG. 12 is a simplified block diagram of several sample aspects of an apparatus configured to support transmit power control as taught herein.

Referring to FIG. 12, an apparatus 1200 is represented as a series of interrelated functional modules. A module for receiving information generated by a plurality of access terminals associated with an access point 1202 may correspond at least in some aspects to, for example, a communication device (e.g., a receiver) as discussed herein. A module for categorizing the access terminals based on the received information 1204 may correspond at least in some aspects to, for example, a processing system as discussed herein. A module for determining transmit power for the access point based on the categorization of the access terminals 1206 may correspond at least in some aspects to, for example, a processing system as discussed herein.

The functionality of the modules of FIG. 12 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. As one specific example, the apparatus 1200 may comprise a single device (e.g., components 1202-1206 comprising different sections of an ASIC). As another specific example, the apparatus 1200 may comprise several devices (e.g., the component 1202 comprising one ASIC and the components 1204 and 1206 comprising another ASIC). The functionality of these modules also may be implemented in some other manner as taught herein. In some aspects one or more of any dashed blocks in FIG. 12 are optional.

In addition, the components and functions represented by FIG. 12 as well as other components and functions described herein, may be implemented using any suitable means. Such means also may be implemented, at least in part, using corresponding structure as taught herein. For example, the components described above in conjunction with the "module for" components of FIG. 12 also may correspond to similarly designated "means for" functionality. Thus, in some aspects one or more of such means may be implemented using one or more of processor components, integrated circuits, or other suitable structure as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm operations described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of operations in any disclosed process is an example of a sample approach. Based upon design preferences, it is understood that the specific order or hierarchy of operations in the processes may be rearranged while remaining within the scope of the present disclosure. The accompanying method claims present elements of the various operations in a sample order, and are not meant to be limited to the specific order or hierarchy presented.

The operations of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising code(s) executable (e.g., executable by at least one computer) to provide functionality relating to one or more of the aspects of the disclosure. In some aspects, a computer program product may comprise packaging materials.

In one or more implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for communication, comprising:
    a communication device configured to receive information generated by a plurality of access terminals in communication with an access point; and
    a processing system configured to:
        categorize the access terminals based on the received information, the received information including measurement report messages sent by the access terminals, and
        determine transmit power for the access point based on the categorization of the access terminals,
    wherein the processing system is configured to categorize the access terminals based at least in part on how many measurement report messages are sent by each access terminal in an active call with the access point.

2. The apparatus of claim 1, wherein the processing system is configured to categorize the access terminals based further on which of the access terminals are associated with a smaller path loss to the access point.

3. The apparatus of claim 1, wherein the processing system is configured to categorize the access terminals based further on which of the access terminals sent a threshold quantity of cell update messages associated with radio link failure to the access point.

4. The apparatus of claim 1, wherein the processing system is configured to categorize the access terminals by identifying a first category of the access terminals and a second category of the access terminals, wherein:
    the first category is based on a quantity of the measurement report messages sent to the access point or on a path loss to the access point derived from the measurement report messages; and
    the second category is based on a quantity of cell update messages sent to the access point.

5. The apparatus of claim 4, wherein the cell update messages are associated with radio link failure.

6. The apparatus of claim 4, wherein the processing system is further configured to categorize the access terminals by identifying a third category of the access terminals that comprises access terminals that are not in the first category or the second category.

7. The apparatus of claim 1, wherein the processing system is configured to categorize the access terminals by identifying:
    a first subset of the access terminals that most frequently obtain service from the access point; and a second subset of the access terminals that obtain service from at least one neighbor access point of the access point.

8. The apparatus of claim 1, wherein the processing system is configured to categorize the access terminals by identifying:
a first subset of the access terminals to be provided a target level of service by the access point; and
a second subset of the access terminals to be protected from interference from the access point.

9. The apparatus of claim 1, wherein the information further comprises at least one of:
cell update messages sent by the access terminals; or
registration messages sent by the access terminals.

10. The apparatus of claim 1, wherein the information further comprises at least one of:
path loss information;
cell update count information; or
registration count information.

11. The apparatus of claim 1, wherein the processing system is configured to determine the transmit power based on a quantity of cell updates sent from at least one of the access terminals to the access point.

12. The apparatus of claim 11, wherein the cell updates are associated with radio link failure.

13. The apparatus of claim 1, wherein the processing system is configured to determine the transmit power based on:
a first type of the information associated with a first category of the access terminals; and
a second type of the information associated with a second category of the access terminals.

14. The apparatus of claim 13, wherein:
the first type of the information comprises path loss information; and
the second type of the information comprises cell update count information.

15. The apparatus of claim 13, wherein:
the first category of the access terminals comprises access terminals that sent a threshold quantity of the measurement report messages to the access point or access terminals that are associated with a smaller path loss to the access point; and
the second category of the access terminals comprises access terminals that sent a threshold quantity of cell update messages associated with radio link failure to the access point.

16. The apparatus of claim 1, wherein the processing system is configured to determine the transmit power by:
determining a nominal transmit power that provides a target signal quality for a target coverage range, wherein the determination of the nominal transmit power is based on a first subset of the information associated with a first category of the access terminals; and
adjusting the nominal transmit power based on a second subset of the information associated with a second category of the access terminals.

17. The apparatus of claim 16, wherein:
the first subset of the information comprises path loss information;
the second subset of the information comprises cell update count information;
the first category of the access terminals comprises access terminals that sent a threshold quantity of the measurement report messages to the access point or access terminals that are associated with a smaller path loss to the access point; and
the second category of the access terminals comprises access terminals that sent a threshold quantity of cell update messages associated with radio link failure to the access point.

18. The apparatus of claim 1, wherein the processing system is configured to determine the transmit power by:
determining a nominal transmit power that provides a target signal quality for a target coverage range, wherein the determination of the nominal transmit power is based on path loss information associated with a first category of the access terminals that sent a threshold quantity of the measurement report messages to the access point; and
adjusting the nominal transmit power based on registration information associated with a third category of the access terminals that is mutually exclusive of the first category of access terminals and mutually exclusive of a second category of the access terminals that sent a threshold quantity of cell update messages associated with radio link failure to the access point.

19. A method of determining transmit power, comprising:
receiving information generated by a plurality of access terminals in communication with an access point;
categorizing the access terminals based on the received information, the received information including measurement report messages sent by the access terminals; and
determining transmit power for the access point based on the categorization of the access terminals,
wherein the categorizing the access terminals comprises categorizing the access terminals based at least in part on how many measurement report messages are sent by each access terminal in an active call with the access point.

20. The method of claim 19, wherein the categorizing the access terminals comprises categorizing based further on which of the access terminals are associated with a smaller path loss to the access point.

21. The method of claim 19, wherein the categorizing the access terminals comprises categorizing based further on which of the access terminals sent a threshold quantity of cell update messages associated with radio link failure to the access point.

22. The method of claim 19, wherein the categorizing the access terminals comprises identifying a first category of the access terminals and a second category of the access terminals, wherein:
the first category is based on a quantity of the measurement report messages sent to the access point or on a path loss to the access point derived from the measurement report messages; and
the second category is based on a quantity of cell update messages sent to the access point.

23. The method of claim 22, wherein the cell update messages are associated with radio link failure.

24. The method of claim 22, wherein the categorizing the access terminals further comprises identifying a third category of the access terminals that comprises access terminals that are not in the first category or the second category.

25. The method of claim 19, wherein the categorizing the access terminals comprises identifying:
a first subset of the access terminals that most frequently obtain service from the access point; and a second subset of the access terminals that obtain service from at least one neighbor access point of the access point.

26. The method of claim 19, wherein the categorizing the access terminals comprises identifying:
a first subset of the access terminals to be provided a target level of service by the access point; and
a second subset of the access terminals to be protected from interference from the access point.

27. The method of claim 19, wherein the information further comprises at least one of:
cell update messages sent by the access terminals; or
registration messages sent by the access terminals.

28. The method of claim 19, wherein the information further comprises at least one of:
path loss information;
cell update count information; or
registration count information.

29. The method of claim 19, wherein the determining the transmit power comprises determining based on a quantity of cell updates sent from at least one of the access terminals to the access point.

30. The method of claim 29, wherein the cell updates are associated with radio link failure.

31. The method of claim 19, wherein the determining the transmit power comprises determining based on:
a first type of the information associated with a first category of the access terminals; and
a second type of the information associated with a second category of the access terminals.

32. The method of claim 31, wherein:
the first type of the information comprises path loss information; and
the second type of the information comprises cell update count information.

33. The method of claim 31, wherein:
the first category of the access terminals comprises access terminals that sent a threshold quantity of the measurement report messages to the access point or access terminals that are associated with a smaller path loss to the access point; and
the second category of the access terminals comprises access terminals that sent a threshold quantity of cell update messages associated with radio link failure to the access point.

34. The method of claim 19, wherein the determining the transmit power comprises:
determining a nominal transmit power that provides a target signal quality for a target coverage range, wherein the determination of the nominal transmit power is based on a first subset of the information associated with a first category of the access terminals; and
adjusting the nominal transmit power based on a second subset of the information associated with a second category of the access terminals.

35. The method of claim 34, wherein:
the first subset of the information comprises path loss information;
the second subset of the information comprises cell update count information;
the first category of the access terminals comprises access terminals that sent a threshold quantity of the measurement report messages to the access point or access terminals that are associated with a smaller path loss to the access point; and the second category of the access terminals comprises access terminals that sent a threshold quantity of cell update messages associated with radio link failure to the access point.

36. The method of claim 19, wherein the determining the transmit power comprises:
determining a nominal transmit power that provides a target signal quality for a target coverage range, wherein the determination of the nominal transmit power is based on path loss information associated with a first category of the access terminals that sent a threshold quantity of the measurement report messages to the access point; and
adjusting the nominal transmit power based on registration information associated with a third category of the access terminals that is mutually exclusive of the first category of access terminals and mutually exclusive of a second category of the access terminals that sent a threshold quantity of cell update messages associated with radio link failure to the access point.

37. An apparatus for communication, comprising:
means for receiving information generated by a plurality of access terminals in communication with an access point;
means for categorizing the access terminals based on the received information, the received information including measurement report messages sent by the access terminals; and
means for determining transmit power for the access point based on the categorization of the access terminals,
wherein the means for categorizing the access terminals categorizes the access terminals based at least in part on how many measurement report messages are sent by each access terminal in an active call with the access point.

38. The apparatus of claim 37, wherein the means for categorizing the access terminals categorizes based further on which of the access terminals are associated with a smaller path loss to the access point.

39. The apparatus of claim 37, wherein the means for categorizing the access terminals categorizes based further on which of the access terminals sent a threshold quantity of cell update messages associated with radio link failure to the access point.

40. The apparatus of claim 37, wherein the means for categorizing the access terminals comprises means for identifying a first category of the access terminals and a second category of the access terminals, wherein:
the first category is based on a quantity of the measurement report messages sent to the access point or on a path loss to the access point derived from the measurement report messages; and
the second category is based on a quantity of cell update messages sent to the access point.

41. The apparatus of claim 40, wherein the cell update messages are associated with radio link failure.

42. The apparatus of claim 40, wherein the means for categorizing the access terminals further comprises means for identifying a third category of the access terminals that comprises access terminals that are not in the first category or the second category.

43. The apparatus of claim 37, wherein the means for categorizing the access terminals comprises means for identifying:
a first subset of the access terminals that most frequently obtain service from the access point; and a second subset of the access terminals that obtain service from at least one neighbor access point of the access point.

44. The apparatus of claim 37, wherein the means for categorizing the access terminals comprises means for identifying:
a first subset of the access terminals to be provided a target level of service by the access point; and
a second subset of the access terminals to be protected from interference from the access point.

45. The apparatus of claim 37, wherein the information further comprises at least one of:
cell update messages sent by the access terminals; or
registration messages sent by the access terminals.

46. The apparatus of claim 37, wherein the information further comprises at least one of:
path loss information;
cell update count information; or
registration count information.

47. The apparatus of claim 37, wherein the means for determining the transmit power determines based on a quantity of cell updates sent from at least one of the access terminals to the access point.

48. The apparatus of claim 47, wherein the cell updates are associated with radio link failure.

49. The apparatus of claim 37, wherein the means for determining the transmit power determines based on:
a first type of the information associated with a first category of the access terminals; and
a second type of the information associated with a second category of the access terminals.

50. The apparatus of claim 49, wherein:
the first type of the information comprises path loss information; and
the second type of the information comprises cell update count information.

51. The apparatus of claim 49, wherein:
the first category of the access terminals comprises access terminals that sent a threshold quantity of the measurement report messages to the access point or access terminals that are associated with a smaller path loss to the access point; and
the second category of the access terminals comprises access terminals that sent a threshold quantity of cell update messages associated with radio link failure to the access point.

52. The apparatus of claim 37, wherein the means for determining the transmit power comprises:
means for determining a nominal transmit power that provides a target signal quality for a target coverage range, wherein the determination of the nominal transmit power is based on a first subset of the information associated with a first category of the access terminals; and
means for adjusting the nominal transmit power based on a second subset of the information associated with a second category of the access terminals.

53. The apparatus of claim 52, wherein:
the first subset of the information comprises path loss information;
the second subset of the information comprises cell update count information;
the first category of the access terminals comprises access terminals that sent a threshold quantity of the measurement report messages to the access point or access terminals that are associated with a smaller path loss to the access point; and
the second category of the access terminals comprises access terminals that sent a threshold quantity of cell update messages associated with radio link failure to the access point.

54. The apparatus of claim 37, wherein the means for determining the transmit power comprises:
means for determining a nominal transmit power that provides a target signal quality for a target coverage range, wherein the determination of the nominal transmit power is based on path loss information associated with a first category of the access terminals that sent a threshold quantity of the measurement report messages to the access point; and
means for adjusting the nominal transmit power based on registration information associated with a third category of the access terminals that is mutually exclusive of the first category of access terminals and mutually exclusive of a second category of the access terminals that sent a threshold quantity of cell update messages associated with radio link failure to the access point.

55. A non-transitory computer-readable medium comprising code for causing a computer to:
receive information generated by a plurality of access terminals in communication with an access point;
categorize the access terminals based on the received information, the received information including measurement report messages sent by the access terminals; and
determine transmit power for the access point based on the categorization of the access terminals,
wherein the code to categorize the access terminals causes the computer to categorize the access terminals based at least in part on how many measurement report messages are sent by each access terminal in an active call with the access point.

56. The non-transitory computer-readable medium of claim 55, wherein the code to categorize the access terminals causes the computer to categorize based further on which of the access terminals are associated with a smaller path loss to the access point.

57. The non-transitory computer-readable medium of claim 55, wherein the code to categorize the access terminals causes the computer to categorize based further on which of the access terminals sent a threshold quantity of cell update messages associated with radio link failure to the access point.

58. The non-transitory computer-readable medium of claim 55, wherein the code to categorize the access terminals comprises code to cause the computer to identify a first category of the access terminals and a second category of the access terminals, wherein:
the first category is based on a quantity of the measurement report messages sent to the access point or on a path loss to the access point derived from the measurement report messages; and
the second category is based on a quantity of cell update messages sent to the access point.

59. The non-transitory computer-readable medium of claim 58, wherein the cell update messages are associated with radio link failure.

60. The non-transitory computer-readable medium of claim 58, wherein the code to categorize the access terminals further comprises code to cause the computer to identify a third category of the access terminals that comprises access terminals that are not in the first category or the second category.

61. The non-transitory computer-readable medium of claim 55, wherein the code to categorize the access terminals comprises code to cause the computer to identify:
- a first subset of the access terminals that most frequently obtain service from the access point; and
- a second subset of the access terminals that obtain service from at least one neighbor access point of the access point.

62. The non-transitory computer-readable medium of claim 55, wherein the code to categorize the access terminals comprises code to cause the computer to identify:
- a first subset of the access terminals to be provided a target level of service by the access point; and
- a second subset of the access terminals to be protected from interference from the access point.

63. The non-transitory computer-readable medium of claim 55, wherein the information further comprises at least one of:
- cell update messages sent by the access terminals; or
- registration messages sent by the access terminals.

64. The non-transitory computer-readable medium of claim 55, wherein the information further comprises at least one of:
- path loss information;
- cell update count information; or
- registration count information.

65. The non-transitory computer-readable medium of claim 55, wherein the code to determine the transmit power causes the computer to determine based on a quantity of cell updates sent from at least one of the access terminals to the access point.

66. The non-transitory computer-readable medium of claim 65, wherein the cell updates are associated with radio link failure.

67. The non-transitory computer-readable medium of claim 55, wherein the code to determine the transmit power causes the computer to determine based on:
- a first type of the information associated with a first category of the access terminals; and
- a second type of the information associated with a second category of the access terminals.

68. The non-transitory computer-readable medium of claim 67, wherein:
- the first type of the information comprises path loss information; and
- the second type of the information comprises cell update count information.

69. The non-transitory computer-readable medium of claim 67, wherein:
- the first category of the access terminals comprises access terminals that sent a threshold quantity of the measurement report messages to the access point or access terminals that are associated with a smaller path loss to the access point; and
- the second category of the access terminals comprises access terminals that sent a threshold quantity of cell update messages associated with radio link failure to the access point.

70. The non-transitory computer-readable medium of claim 55, wherein the code to determine the transmit power comprises code to cause the computer to:
- determine a nominal transmit power that provides a target signal quality for a target coverage range, wherein the determination of the nominal transmit power is based on a first subset of the information associated with a first category of the access terminals; and
- adjust the nominal transmit power based on a second subset of the information associated with a second category of the access terminals.

71. The non-transitory computer-readable medium of claim 70, wherein:
- the first subset of the information comprises path loss information;
- the second subset of the information comprises cell update count information;
- the first category of the access terminals comprises access terminals that sent a threshold quantity of the measurement report messages to the access point or access terminals that are associated with a smaller path loss to the access point; and
- the second category of the access terminals comprises access terminals that sent a threshold quantity of cell update messages associated with radio link failure to the access point.

72. The non-transitory computer-readable medium of claim 55, wherein the code to determine the transmit power comprises code to cause the computer to:
- determine a nominal transmit power that provides a target signal quality for a target coverage range, wherein the determination of the nominal transmit power is based on path loss information associated with a first category of the access terminals that sent a threshold quantity of the measurement report messages to the access point; and
- adjust the nominal transmit power based on registration information associated with a third category of the access terminals that is mutually exclusive of the first category of access terminals and mutually exclusive of a second category of the access terminals that sent a threshold quantity of cell update messages associated with radio link failure to the access point.

* * * * *